US009799101B2

United States Patent
Naruse et al.

(10) Patent No.: US 9,799,101 B2
(45) Date of Patent: Oct. 24, 2017

(54) RESTORATION FILTER GENERATION DEVICE AND METHOD, IMAGE PROCESSING DEVICE AND METHOD, IMAGING DEVICE, AND NON-TRANSITORY COMPUTER-READABLE MEDIUM

(71) Applicant: FUJIFILM Corporation, Tokyo (JP)

(72) Inventors: Yousuke Naruse, Saitama (JP); Kenkichi Hayashi, Saitama (JP); Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 193 days.

(21) Appl. No.: 14/844,831

(22) Filed: Sep. 3, 2015

(65) Prior Publication Data
US 2015/0379695 A1    Dec. 31, 2015

Related U.S. Application Data

(63) Continuation of application No. PCT/JP2013/080648, filed on Nov. 13, 2013.

(30) Foreign Application Priority Data

Mar. 4, 2013 (JP) ................................ 2013-042186

(51) Int. Cl.
G06K 9/40 (2006.01)
G06T 5/00 (2006.01)
(Continued)

(52) U.S. Cl.
CPC .............. *G06T 5/002* (2013.01); *G06T 5/003* (2013.01); *G06T 5/20* (2013.01); *H04N 1/409* (2013.01);
(Continued)

(58) Field of Classification Search
CPC  G06T 5/002; G06T 5/003; G06T 5/20; G06T 2207/20024; G06T 2207/10024;
(Continued)

(56) References Cited

U.S. PATENT DOCUMENTS 5,642,440 A  *  6/1997  Leib .......................... G06K 9/58
                                                               382/192
2011/0135216 A1* 6/2011 Hatakeyama ........... G06T 5/003
                                                               382/260
(Continued)

FOREIGN PATENT DOCUMENTS

CN         102280074 A    12/2011
JP         2010-140442 A   6/2010
(Continued)

OTHER PUBLICATIONS

International Search Report, issued in PCT/JP2013/080648, dated Dec. 24, 2013.
(Continued)

*Primary Examiner* — Amir Alavi
(74) *Attorney, Agent, or Firm* — Birch, Stewart, Kolasch & Birch, LLP

(57) ABSTRACT

A restoration filter generation device that generates a restoration filter to perform restoration processing on luminance system image data that is image data related to luminance, which is generated based on image data of respective colors of multiple colors obtained by an imaging device having an optical system, includes an information acquisition device acquiring transfer function information corresponding to point image distribution in the optical system, for each color of the multiple colors, and a restoration filter generation device generating the restoration filter based on the transfer function information acquired by the information acquisition device and generating the restoration filter that performs phase correction of the luminance system image data
(Continued)

according to the transfer function information on a single color of the multiple colors.

18 Claims, 15 Drawing Sheets

(51) Int. Cl.
    *H04N 1/409*     (2006.01)
    *H04N 1/58*     (2006.01)
    *G06T 5/20*     (2006.01)
    *H04N 1/60*     (2006.01)
    *H04N 9/04*     (2006.01)
    *H04N 9/64*     (2006.01)
    *H04N 5/217*     (2011.01)

(52) U.S. Cl.
    CPC ............ *H04N 1/58* (2013.01); *H04N 1/6005* (2013.01); *H04N 5/217* (2013.01); *H04N 9/04* (2013.01); *H04N 9/646* (2013.01); *G06T 2207/10004* (2013.01); *G06T 2207/10024* (2013.01); *G06T 2207/20024* (2013.01)

(58) Field of Classification Search
    CPC ........ G06T 2207/10004; H04N 1/6005; H04N 9/04; H04N 9/646
    See application file for complete search history.

(56) References Cited

U.S. PATENT DOCUMENTS

| | | |
|---|---|---|
| 2011/0199514 A1 | 8/2011 | Tamura |
| 2011/0285680 A1 | 11/2011 | Nakamura |
| 2011/0285879 A1* | 11/2011 | Hatakeyama ........... G06T 5/003 348/241 |
| 2011/0292257 A1 | 12/2011 | Hatakeyama |
| 2012/0069237 A1 | 3/2012 | Kishine |
| 2012/0154626 A1 | 6/2012 | Hatakeyama et al. |
| 2013/0050539 A1* | 2/2013 | Watanabe ............... G06T 5/003 348/241 |
| 2013/0120643 A1* | 5/2013 | Tamaki .................... G02B 7/28 348/349 |
| 2015/0207962 A1* | 7/2015 | Sugimoto ............ H04N 19/117 382/261 |
| 2015/0248776 A1* | 9/2015 | Kasahara ............. G06T 11/006 348/222.1 |
| 2015/0379695 A1* | 12/2015 | Naruse ................... H04N 1/409 348/234 |
| 2016/0027155 A1* | 1/2016 | Naruse ................... H04N 1/409 382/167 |
| 2016/0117806 A1* | 4/2016 | Hayashi ................. G06T 5/003 382/218 |

FOREIGN PATENT DOCUMENTS

| | | |
|---|---|---|
| JP | 2011-193277 A | 9/2011 |
| JP | 2012-65187 A | 3/2012 |
| JP | 2012-129932 A | 7/2012 |
| WO | WO 2011/122283 A1 | 10/2011 |

OTHER PUBLICATIONS

Written Opinion of the International Searching Authority, issued in PCT/JP2013/080648, dated Dec. 24, 2013.
Chinese Office Action dated Dec. 2, 2016, issued in corresponding Chinese Patent Application No. 201380074234.4.
Chinese Office Action and English translation thereof, dated Jul. 13, 2017 for Application No. 201380074234.4.

* cited by examiner

CASE WHERE PHASE SHIFT DIRECTIONS OF R, G AND B ARE IDENTICAL

CASE WHERE PHASE SHIFT DIRECTIONS OF R, G AND B ARE DIFFERENT

RESTORATION FILTER GENERATION DEVICE AND METHOD, IMAGE PROCESSING DEVICE AND METHOD, IMAGING DEVICE, AND NON-TRANSITORY COMPUTER-READABLE MEDIUM

CROSS-REFERENCE TO RELATED APPLICATIONS

This application is a Continuation of PCT International Application No. PCT/JP2013/080648 filed on Nov. 13, 2013, which claims priority under 35 U.S.C §119(a) to Japanese Patent Application No. 2013-042186 filed on Mar. 4, 2013. Each of the above application(s) is hereby expressly incorporated by reference, in its entirety, into the present application.

BACKGROUND OF THE INVENTION

Field of the Invention

The present invention relates to a restoration filter generation device and method that generate a restoration filter to perform restoration processing on luminance system image data generated on the basis of the image data of each color of multiple colors, an image processing device and method that perform restoration processing using this restoration filter, an imaging device including this image processing device, and a program to generate a restoration filter and a non-transitory computer-readable medium.

Description of the Related Art

In an image obtained by imaging an object by an imaging device such as a digital camera, there is a case where image degradation that originates in various aberrations of an optical system (such as an imaging lens) occurs. This image degradation by aberration can be expressed by a PSF (Point Spread Function), or the like. Therefore, the image degradation can be reduced by generating a restoration filter on the basis of the deterioration characteristic of an optical system such as the PSF and performing point image restoration processing (restoration processing) on image data by using this restoration filter.

Japanese Patent Application Laid-Open No. 2010-140442 (hereinafter referred to as PTL 1) (especially, see paragraphs 0043 to 0048) discloses an invention that separates luminance component Y from image data input from an image capturing device, acquires point spread function PSFy (=Wr×PSFr+Wg×PSFg+Wb×PSFb) of the luminance component by synthesizing point spread functions (PSFr, PSFg, PSFb) of respective colors of R, G and B by using coefficients (Wr, Wg, Wb) of R, G and B in the luminance component Y (=Wr×R+Wg×G+Wb×B), and calculates a correction coefficient with respect to luminance component Y on the basis of point spread function PSFy of this luminance component.

Japanese Patent Application Laid-Open No. 2011-193277 (hereinafter referred to as PTL 2) discloses an invention that changes the gain of a restoration filter (amplitude characteristic) according to the amount of adjustment with an adjustment bar by the user in a case where the amplitude characteristic is selected as an adjustment parameter of the restoration filter, and changes the phase angle (phase characteristic) of the restoration filter according to the amount of adjustment with the adjustment bar by the user in a case where the phase characteristic is selected as an adjustment parameter.

Japanese Patent Application Laid-Open No. 2012-129932 (hereinafter referred to as PTL 3) discloses an invention that reduces a difference (chromatic aberration) between color components of a point spread function by relative parallel displacement and generates a restoration filter on the basis of the point spread function.

SUMMARY OF THE INVENTION

In the invention described in PTL 1, since only the luminance component of image data of a correction target is corrected, the phase shift amounts of R, G and B can be averagely returned in all colors, but there is a problem that the excessive return (overcorrection) of phase shift is generated in the color of a specific wavelength. Especially, in a case where phase correction is performed on luminance system image data, phase overcorrection is easily caused unlike a case where phase correction is individually performed on image data (R image data, G image data and B image data) of respective colors of multiple colors (R, G, B). When the phase is overcorrected, an artifact is caused, and image quality may be rather degraded.

The amplitude characteristic (modulation characteristic) and phase characteristic of a restoration filter can be individually adjusted by a user input in the invention described in PTL 2, but there is a problem that overcorrection occurs.

A restoration filter with respect to image data subjected to chromatic aberration correction can be generated in the invention described in PTL 3, but there is a problem that overcorrection occurs.

It is an object of the present invention to provide a restoration filter generation device and method that can prevent overcorrection that is excessive restoration of a phase shift in a case where restoration processing is performed on luminance system image data, an image processing device and method, an imaging device, a program and a a non-transitory computer-readable medium.

To achieve the above-mentioned object, one mode of the present invention provides a restoration filter generation device that generates a restoration filter to perform restoration processing on luminance system image data that is image data related to luminance, which is generated based on image data of respective colors of multiple colors obtained by an imaging device having an optical system, including: an information acquisition device acquiring transfer function information corresponding to point image distribution in the optical system, for each color of the multiple colors; and a restoration filter generation device generating the restoration filter based on the transfer function information acquired by the information acquisition device and generating the restoration filter that performs phase correction of the luminance system image data according to the transfer function information on a single color of the multiple colors.

As "transfer function information" acquired by the information acquisition device, for example, there are a PSF (Point Spread Function, which may be referred to as "point image distribution function" or "point spread function"), an OTF (Optical Transfer Function, which may be referred to as "optical transfer function") obtained by Fourier transform of the PSF, a PTF (Phase Transfer Function, which may be referred to as "phase transfer function") and an MTF (Modulation Transfer Function). Moreover, "transfer function information" is not limited to information that directly shows "phase shift amount". "Phase shift amount" may be calculated by performing specific operation processing on "transfer function information". That is, "transfer function information" includes information that indirectly shows "phase shift amount".

Restoration filter generation processing for "generating the restoration filter that performs phase correction of the luminance system image data according to the transfer function information on a single color of the multiple colors" in the restoration filter generation device includes: a first case where transfer function information only on a single color of multiple colors is used in the whole of one luminance system image data (whole of one image surface); and a second case where transfer function information on a single color is selected from transfer function information on respective colors of multiple colors every position of one luminance system image data (whole of one image surface).

According to one mode of the present invention, since a restoration filter that performs phase correction of luminance system image data is generated according to transfer function information on a single color of multiple colors, it is possible to reduce the operation load as compared with a case where phase correction is individually performed on image data of respective colors of multiple colors, and prevent overcorrection that is excessive restoration of a phase shift.

According to one mode of the present invention, the restoration filter generation device selects a single-color phase shift amount whose absolute value is minimum, from phase shift amounts of respective colors of the multiple colors obtained from the transfer function information on respective colors of the multiple colors, and generates the restoration filter to correct a phase shift of the luminance system image data by a phase correction amount corresponding to the selected single-color phase shift amount. By this means, even in a case where a color whose phase shift amount has a minimum absolute value varies every optical system, it becomes possible to adequately prevent overcorrection by the restoration filter.

In one mode of the present invention, the restoration filter generation device selects the single-color phase shift amount for each position in an image surface and generates the restoration filter that corrects a phase shift of the luminance system image data according to the single-color phase shift amount. By this means, even in a case where a color whose phase shift amount has a minimum absolute value varies every position in the luminance system image data, it becomes possible to adequately prevent overcorrection. Moreover, even in a case where a PSF (Point Spread Function) is used as transfer function information, it becomes possible to adequately prevent overcorrection.

In one mode of the present invention, the restoration filter generation device selects the single-color phase shift amount for each spatial frequency and generates the restoration filter that corrects a phase shift of the luminance system image data according to the single-color phase shift amount. By this means, even in a case where a color whose phase shift amount has a minimum absolute value varies every spatial frequency, it becomes possible to adequately prevent overcorrection. Moreover, even in a case where a PSF (Point Spread Function) defined depending on a frequency is used as transfer function information, it becomes possible to adequately prevent overcorrection.

In one mode of the present invention, when a sign of the phase shift amount is different in the multiple colors, the restoration filter generation device sets a phase correction amount with respect to the luminance system image data to 0, and, when the sign of the phase shift amount is identical in all of the multiple colors, selects a single-color phase shift amount whose absolute value is minimum, adopts a phase correction amount corresponding to the single-color phase shift amount and generates the restoration filter. By this means, even in a case where the sign of the phase shift amount varies in multiple colors, it becomes possible to adequately prevent overcorrection.

In one mode of the present invention, the restoration filter generation device includes an operation unit that operates a filter coefficient of the restoration filter, assuming the number of taps of the restoration filter as an input parameter and assuming an absolute value of a phase correction amount of the restoration filter to be equal to or less than an absolute value of a phase shift amount in the optical system every spatial frequency. By this means, the filter coefficient of a restoration filter is calculated by operation "assuming the number of taps of the restoration filter as an input parameter" and "assuming the absolute value of the phase correction amount of the restoration filter to be equal to or less than the absolute value of the phase shift amount in an optical system", and therefore it is possible to generate a restoration filter that surely prevents overcorrection due to the existence of tap number limitation.

In one mode of the present invention, one color of the multiple colors is green (G), the information acquisition device acquires at least transfer function information on green (G) of multiple colors, and the restoration filter generation device generates the restoration filter that corrects a phase shift of the luminance system image data by a phase correction amount corresponding to the transfer function information on green (G). By this means, since the restoration filter is generated on the basis of only the transfer function information on green (G), it is possible to generate the restoration filter that can surely prevent overcorrection in green, and generate the restoration filter with less occurrence probability of overcorrection in other colors. Since a color that contributes to luminance system image data most is generally green (G), it is general to design an optical system such that green (G) is not blurred most. In such a case, by generating a restoration filter that performs phase correction corresponding to transfer function information on a single color of green (G), it is possible to prevent overcorrection of phase correction even in red (R) and blue (B). That is, it is possible to generate a restoration filter with less overcorrection in any color of multiple colors very easily.

In one mode of the present invention, a switching device switching whether to cause the restoration filter to perform the phase correction with respect to the luminance system image data is included, and, when the restoration filter is not caused to perform the phase correction, the restoration filter generation device mixes the transfer function information between multiple colors, and, based on the transfer function information mixed between the multiple colors, generates the restoration filter that performs point image restoration processing on the luminance system image data without changing a phase component. By this means, it becomes possible to switch whether to cause the restoration filter to perform the phase correction with respect to the luminance system image data, and it is not necessary to support overcorrection due to phase correction in a case where the phase correction is not performed. Therefore, by generating the restoration filter that performs point image restoration processing on the luminance system image data without changing a phase component on the basis of the transfer function information mixed between multiple colors, it becomes possible to generate a restoration filter that gives excellent image quality.

Moreover, another mode of the present invention provides a restoration filter generation device that generates a restoration filter to perform restoration processing on luminance system image data that is image data related to luminance, which is generated based on image data of respective colors of multiple colors obtained by an imaging device having an optical system, including: an information acquisition device acquiring transfer function information corresponding to point image distribution in the optical system, for each color of the multiple colors; and a restoration filter generation device generating the restoration filter based on the transfer function information acquired by the information acquisition device, where the restoration filter generation device mixes the transfer function information between multiple colors, and, based on the transfer function information mixed between the multiple colors, generates a restoration filter to perform restoration processing on the luminance system image data without changing a phase component. According to this mode, since it is not necessary to support overcorrection due to phase correction, by generating the restoration filter that performs point image restoration processing on the luminance system image data without changing a phase component on the basis of the transfer function information mixed between multiple colors, it becomes possible to generate a restoration filter that gives excellent image quality.

In one mode of the present invention, the information acquisition device acquires optical transfer functions of respective colors of multiple colors in the optical system by performing Fourier transform of point image distribution functions of respective colors of the multiple colors in the optical system, and, when the restoration filter is not caused to perform phase correction, the restoration filter generation device mixes modulation transfer functions of respective colors that are amplitude components of the optical transfer functions of respective colors between the multiple colors, and, based on the modulation transfer functions mixed between the multiple colors, performs restoration processing on the luminance system image data without changing a phase component.

In one mode of the present invention, the information acquisition device acquires lateral chromatic aberration correction information that shows whether to implement lateral chromatic aberration correction with respect to image data of respective colors of the multiple colors before the luminance system image data is generated, and, when detecting that the lateral chromatic aberration correction is implemented based on the lateral chromatic aberration correction information, the restoration filter generation device performs coordinate movement processing for a correction amount in the lateral chromatic aberration correction on the transfer function information on respective colors acquired by the information acquisition device, and mixes the transfer function information on respective colors after the coordinate movement processing between multiple colors. By this means, even in a case where a position shift (lateral chromatic aberration) between multiple colors is corrected, it becomes possible to generate a restoration filter that can surely prevent overcorrection.

In one mode of the present invention, the optical system includes a lens unit that modulates a phase and extends a depth of field.

Moreover, another mode of the present invention provides an image processing device including: an image data acquisition device acquiring luminance system image data that is image data related to luminance, which is generated based on image data of respective colors of multiple colors obtained by an imaging device having an optical system; a restoration filter storage device storing the restoration filter generated by the above-mentioned restoration filter generation device; and a restoration processing device performing restoration processing on the luminance system image data acquired in the image data acquisition device, using the restoration filter stored in the restoration filter storage device.

Moreover, another mode of the present invention provides an image processing device including the restoration filter generation device.

Moreover, another mode of the present invention provides an imaging device including: an imaging device with an optical system for outputting image data of respective colors of multiple colors; and an image processing device.

Moreover, another mode of the present invention provides a restoration filter generation method that generates a restoration filter to perform restoration processing on luminance system image data that is image data related to luminance, which is generated based on image data of respective colors of multiple colors obtained by an imaging device having an optical system, including: an information acquisition step of acquiring transfer function information corresponding to point image distribution in the optical system, for each color of the multiple colors; and a restoration filter generation step of generating the restoration filter based on the transfer function information acquired in the information acquisition step and generating the restoration filter that performs phase correction of the luminance system image data according to the transfer function information on a single color of the multiple colors.

Moreover, another mode of the present invention provides an image processing method including: an image data acquisition step of acquiring luminance system image data that is image data related to luminance, which is generated based on image data of respective colors of multiple colors obtained by an imaging device having an optical system; and a restoration processing step of performing restoration processing on the luminance system image data acquired in the image data acquisition step, using the generated restoration filter.

Moreover, another mode of the present invention provides a non-transitory computer-readable medium recording a program for generating a restoration filter to generate a restoration filter to perform restoration processing on luminance system image data that is image data related to luminance, which is generated based on image data of respective colors of multiple colors obtained by an imaging device having an optical system, and causing a computer to execute: an information acquisition step of acquiring transfer function information corresponding to point image distribution in the optical system, for each color of the multiple colors; and a restoration filter generation step of generating the restoration filter based on the transfer function information acquired in the information acquisition step and generating the restoration filter that performs phase correction of the luminance system image data according to the transfer function information on a single color of the multiple colors.

According to the present invention, it is possible to prevent overcorrection that is excessive restoration of a phase shift in a case where an operation load is reduced by performing phase correction of luminance system image data more than by performing phase correction for each color.

DETAILED DESCRIPTION OF THE PREFERRED EMBODIMENTS

Embodiments of the present invention are described with reference to the accompanying drawings.
<System Configuration Example>

Figure 1:
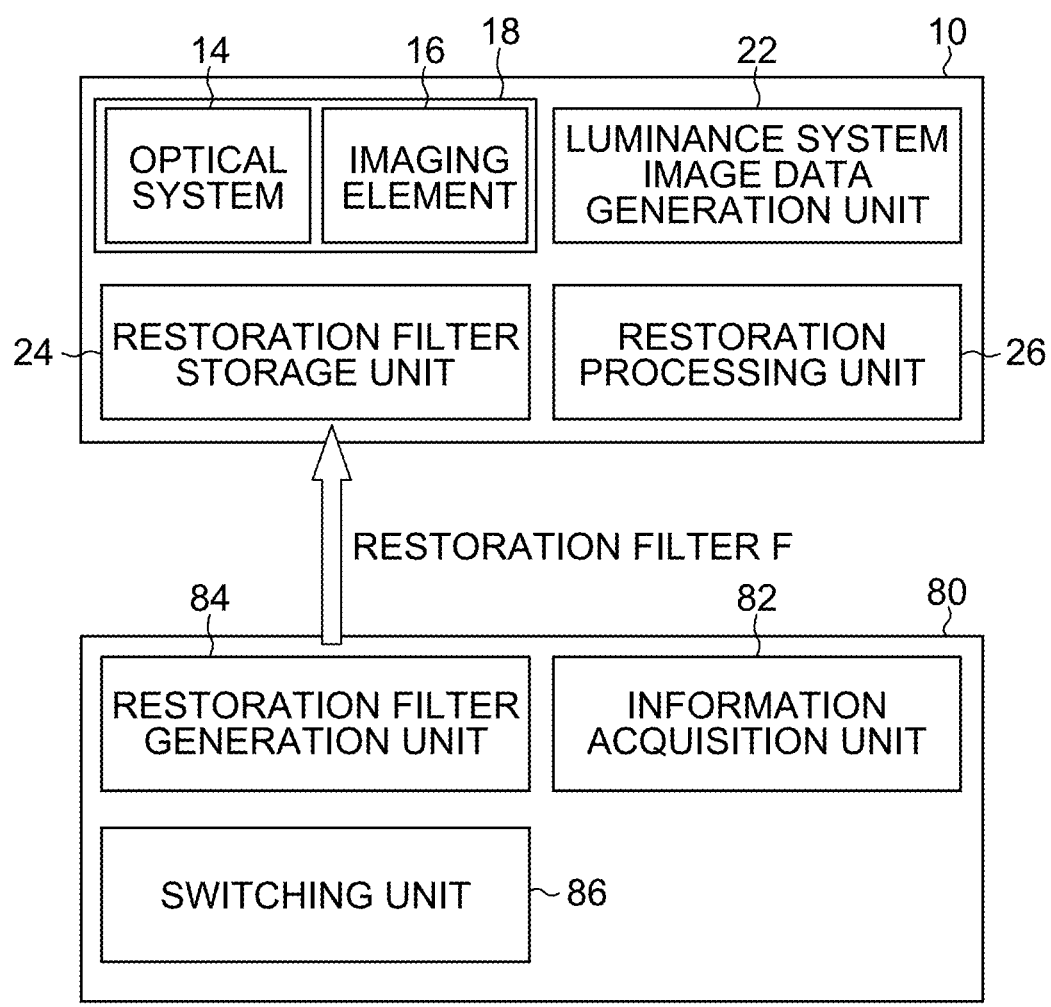
FIG. 1 is a block diagram illustrating a system configuration example including a restoration filter generation device to which the present invention is applied and a digital camera as one example of an image processing device.

FIG. 1 is a block diagram illustrating a system configuration example including a restoration filter generation device to which the present invention is applied and a digital camera as one example of an image processing device.

A digital camera 10 (imaging device) is formed including: an imaging unit 18 (imaging device) that has an optical system 14 and an imaging element 16; a luminance system image data generation unit 22 (luminance system image data generation device) that generates luminance system image data that is image data related to luminance on the basis of the image data of each color of multiple colors (R, G and B in this example) obtained by the imaging unit 18; a restoration filter storage unit 24 (restoration filter storage device) that stores restoration filter F to perform restoration processing on the luminance system image data; and a restoration processing unit 26 (restoration processing device) that performs point image restoration processing on the luminance system image data, using restoration filter F stored in the restoration filter storage unit 24.

A restoration filter generation device 80 is formed including: an information acquisition unit 82 (information acquisition device) that acquires transfer function information corresponding to point image distribution in the optical system 14 of the digital camera 10 for each color of multiple colors; a restoration filter generation unit 84 (restoration filter generation device) that generates restoration filter F on the basis of the transfer function information acquired by the information acquisition unit 82; and a switching unit 86 (switching device) that switches whether to cause restoration filter F to perform phase correction of the luminance system image data.

As "transfer function information" acquired by the information acquisition unit 82, for example, there are a PSF (Point Spread Function, which may be referred to as "point image distribution function" or "point spread function") and an OTF (Optical Transfer Function, which may be referred to as "optical transfer function") obtained by Fourier transform of the PSF. The OTF includes an MTF (Modulation Transfer Function, which may be referred to as "modulation transfer function") and a PTF (Phase Transfer Function, which may be referred to as "phase transfer function"). A case where only the MTF or the PTF is acquired as "optical transfer function" is also included. Moreover, it may be a case where "phase shift amount" is calculated from "transfer function information". That is, it may be a case where "transfer function information" includes information that indirectly shows "phase shift amount".

The restoration filter generation unit 84 generates a restoration filter that performs phase correction of luminance system image data according to transfer function information on a single color of multiple colors.

Here, as for "performs phase correction of luminance system image data according to transfer function information on a single color", it is roughly divided as follows. First, there is a mode in which transfer function information is acquired for each color of multiple colors and the phase shift amount of a single color is selected from the phase shift amounts of respective colors of multiple colors for each image surface position in the real space. Here, "image surface position" corresponds to a two-dimensional position on the image surface of degraded image data (for example, luminance system image data), which corresponds to a two-dimensional position on the imaging surface of the imaging element 16 illustrated in FIG. 2. Moreover, as for selection of the phase shift amount for "each image surface position", it is not limited to a case where the phase shift amount is selected for each point on the image surface, and it may be a case where the phase shift amount is selected for each partial region on the image surface. Second, there is a mode in which transfer function information is acquired for each color of multiple colors and the phase shift amount of a single color is selected from the phase shift amounts of respective colors of multiple colors for each spatial frequency in the frequency space. Here, the second mode includes a case where the phase shift amount is selected for each image surface position in the real space and each spatial frequency in the frequency space. Moreover, as for selection of the phase shift amount for "each spatial frequency", it is not limited to a case where the phase shift amount is selected for each frequency unit, and it may be a case where the phase shift amount is selected for each frequency band. In the above-mentioned first mode and second mode, the filter coefficient of a restoration filter is calculated so as to correct a phase shift by a phase correction amount corresponding to the selected phase shift amount of the single color. Third, there is a mode in which transfer function information on a single color is acquired and the filter coefficient of a restoration filter is calculated so as to correct a phase shift by a phase correction amount corresponding to the phase shift amount of the single color.

The luminance system image data generation unit 22 of the digital camera 10 performs YC conversion processing on RGB image data R, G and B, and generates luminance system image data Y and color difference system image data Cb and Cr. For example, luminance system image data Y is generated according to equation [Y=0.3R+0.6G+0.1B]. Since the contribution rate of the G color becomes 60% in this equation, the G color has a higher contribution ratio than the R color (contribution rate of 30%) and the B color (contribution rate of 10%). Therefore, the G color is a color that contributes to a luminance signal most among three primary colors.

Explanation is given by exemplifying the value of a luminance signal of a color space shown by "Y, Cb, Cr" as "luminance system image data" in the present embodiment, but it is not especially limited as long as it is data that contributes to the luminance of an image, and it means various kinds of data having information on the luminance of a taken image. For example, data showing brightness L in CIELAB color space (Commission internationale de l'eclairage), data with the highest contribution rate to obtain a luminance signal and data corresponding to a color filter of a color that contributes to luminance most, and so on, are enumerated.

<Principle of Point Image Restoration>

Figure 2:
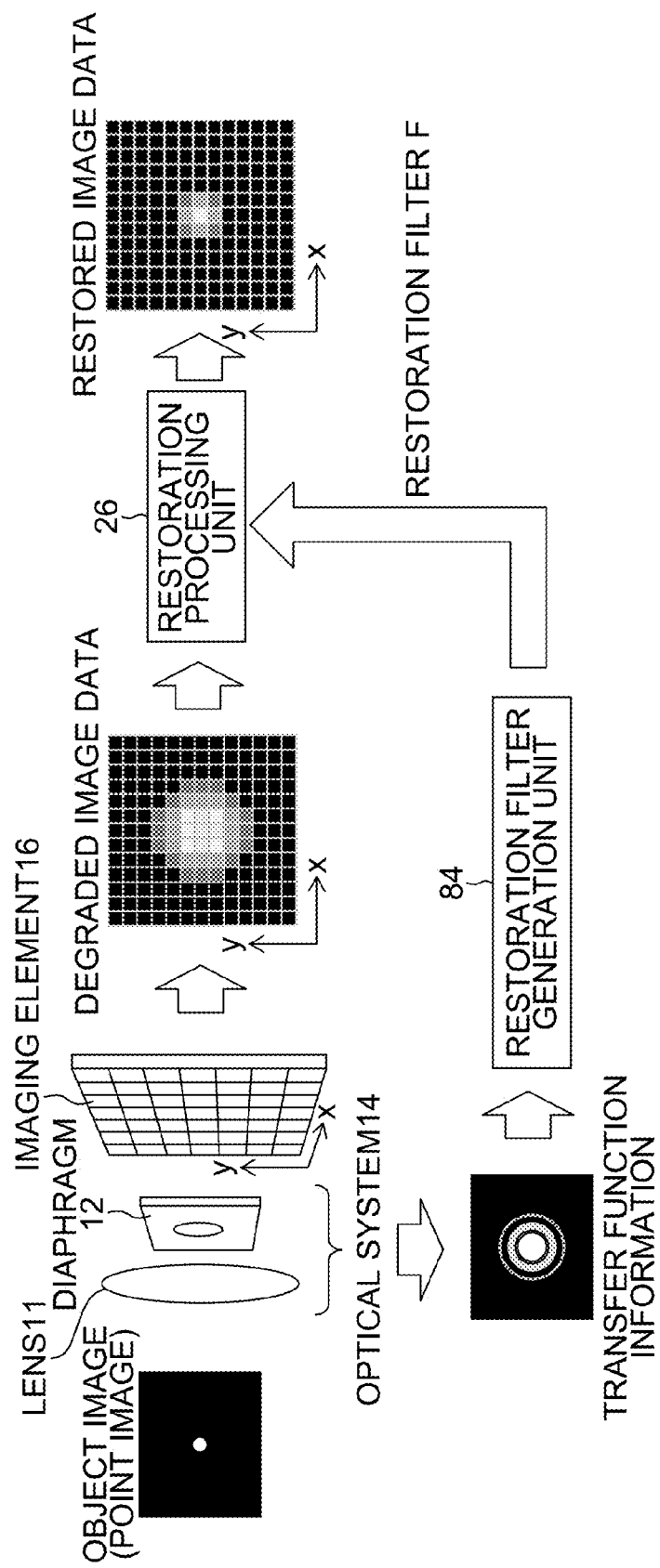
FIG. 2 is an explanatory diagram to describe the principle of point image restoration processing.

FIG. 2 is an explanatory diagram to describe the principle of point image restoration processing. FIG. 2 illustrates a case where a point image is taken as an object image, for ease of understanding. The object image is formed on the imaging surface of the imaging element 16 through the optical system 14 including a lens 11 and a diaphragm 12, and is taken by the imaging element 16. Degraded image data which is image data whose object image is degraded due to the aberration of the optical system 14 is output from the imaging element 16. Then, the characteristic of degradation in the optical system 14 is found beforehand as transfer function information based on imaging conditions (for example, a diaphragm value, a focal distance, an object distance and a lens type, and so on). Moreover, restoration filter F for point image restoration processing is generated by the restoration filter generation unit 84 in FIG. 1 on the basis of the found transfer function information. Restoration filter F is used by the restoration processing unit 26 in FIG. 1 to perform point image restoration processing that cancels the degradation of degraded image data. By doing so, it is possible to obtain restored image data whose degradation is canceled.

The point image restoration processing can be roughly classified into "phase correction" (which may be referred to as "phase restoration" below) and "amplitude correction" (which may be referred to as "amplitude restoration", "frequency correction" or "frequency restoration" below). "Phase correction" is image processing that restores a degraded phase characteristic (PTF) in an optical system. An asymmetric point spread shape can be corrected to a point-symmetry point spread shape by the phase correction. "Amplitude correction" is image processing that restores the degraded amplitude characteristic (MTF) in the optical system. A point spread shape can be corrected to a point (delta function) by the amplitude correction. However, it may not be completely restored to the point shape if a blur is serious or the SN ratio is poor.

Moreover, since the aberration of the optical system 14 varies according to the wavelength, it is ideally preferable to perform point image restoration processing using a restoration filter that varies every color (for example, R, G and B). However, when the point image restoration processing is performed on the image data of each color of multiple colors (for example, R, G and B), the load of operation processing is large. Therefore, the point image restoration processing is performed on luminance system image data with a large visual effect by the restoration processing unit 26 in FIG. 1. The restoration filter generation unit 84 in FIG. 1 generates restoration filter F for luminance system image data.

Figure 3:
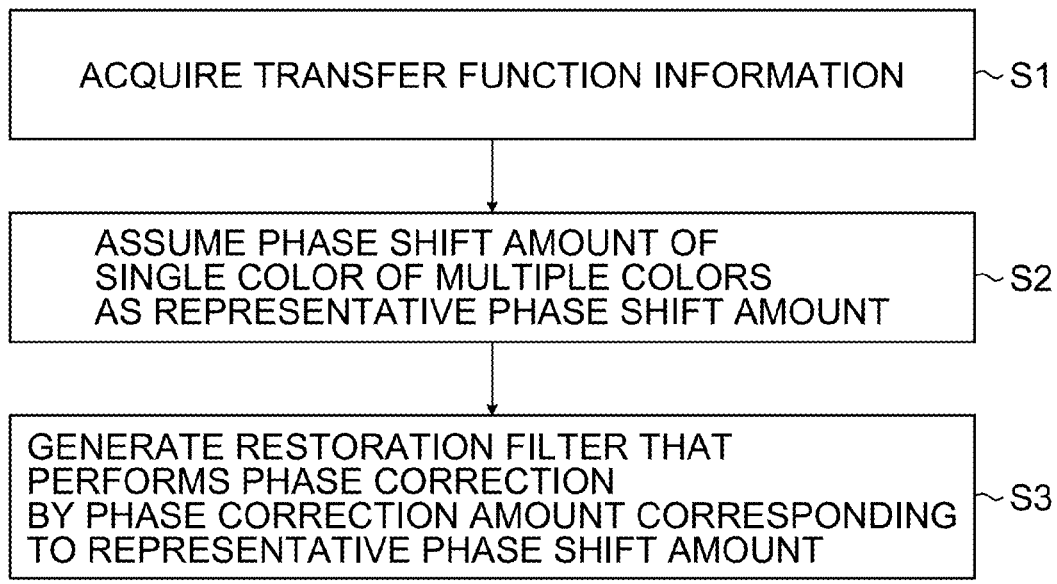
FIG. 3 is a flowchart illustrating the outline of one example of restoration filter generation processing.

FIG. 3 is a flowchart illustrating the outline of one example of the restoration filter generation processing by the restoration filter generation unit 84.

In step S1, transfer function information corresponding to point image distribution in the optical system 14 is acquired by the information acquisition unit 82 for each color of multiple colors.

In step S2, the phase shift amount of a single color of multiple colors is decided by the restoration filter generation unit 84 as a representative phase shift amount, on the basis of the transfer function information acquired in step S1.

In step S3, a restoration filter that performs phase correction of luminance system image data is generated by the restoration filter generation unit 84, on the basis of the representative phase shift amount decided in step S2.

Here, only a part related to a phase correction function has been described in FIG. 3 for ease of understanding of the present invention, but a restoration filter having an amplitude correction (frequency correction) function may be generated as described later.

Figure 4:
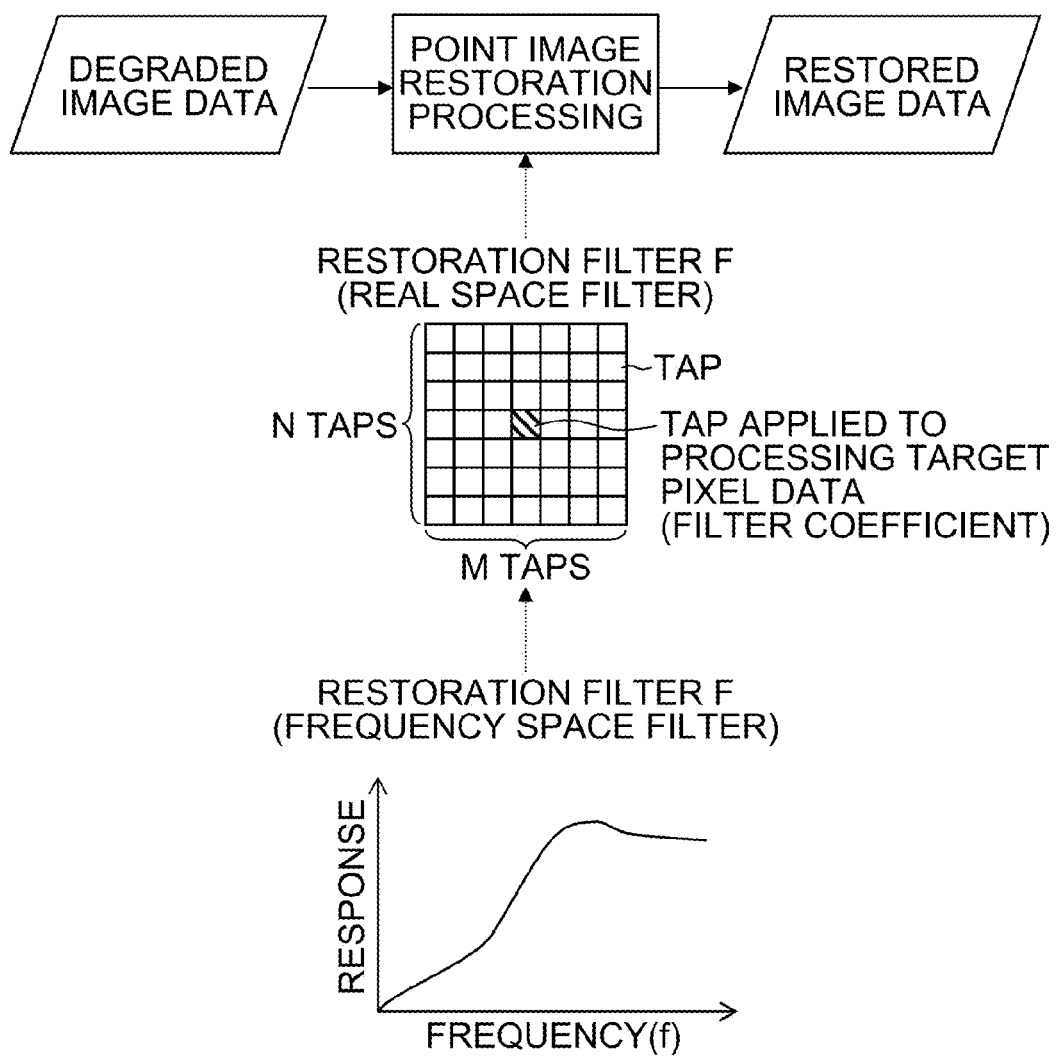
FIG. 4 is a block diagram illustrating the outline of one example of restoration processing.

FIG. 4 is a block diagram illustrating the outline of one example of restoration processing.

The restoration processing is point image restoration processing that mainly creates restored image data from degraded image data using restoration filter F. For example, the point image restoration processing is performed using a restoration filter F on a real space, which includes N×M (N and M are integers equal to or greater than 2) taps. By this means, pixel data after the point image restoration processing (restored image data) can be calculated by convoluting the filter coefficient assigned to each tap and corresponding image data (processing target pixel data and adjacent pixel data of degraded image data). By applying this convolution operation using restoration filter F to all pixel data forming the image data while sequentially changing the target pixel, it is possible to perform the point image restoration processing.

Here, a restoration filter on the real space (real space filter), which includes N×M taps, can be derived by performing inverse Fourier transform of a restoration filter (frequency space filter) on the frequency space (which may be referred to as "spatial frequency domain"). Therefore, the restoration filter on the real space can be arbitrarily calculated by specifying a restoration filter on a base frequency space and specifying the number of taps of a restoration filter on the real space.

<Principle of Phase Correction that does not Cause Overcorrection>

In a case where phase correction is performed on luminance system image data, phase overcorrection is easily caused unlike a case where phase correction is individually performed on image data (R image data, G image data and B image data) of respective colors of multiple colors (R, G, B). When the phase is overcorrected, an artifact is caused, and image quality may be rather degraded.

Then, the restoration filter generation unit 84 selects transfer function information on a single color from transfer function information on respective colors of multiple colors (R, G and B) such that phase correction is not overcorrection in each color of multiple colors, calculates a phase correction amount on the basis of the selected transfer function information, and generates a restoration filter having a function that performs phase correction by the calculated phase correction amount.

Figure 5:
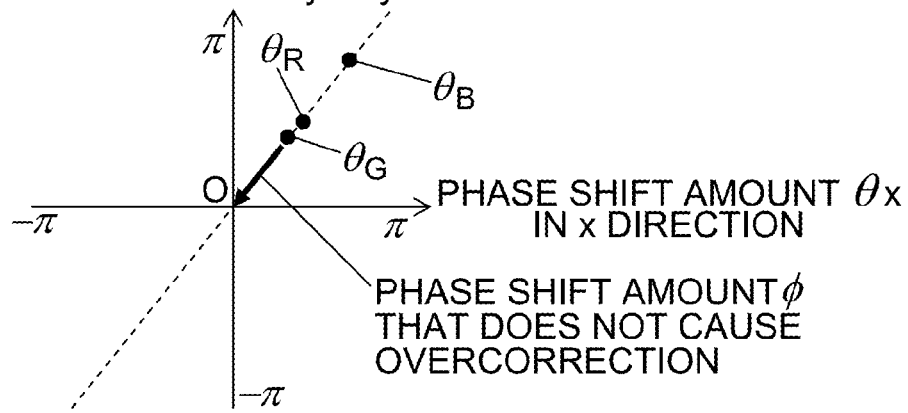
FIG. 5 is an explanatory diagram to describe the relationship between a phase shift amount and a phase correction amount that does not cause overcorrection in a case where the position shift directions of multiple colors are the same.
Figure 6:
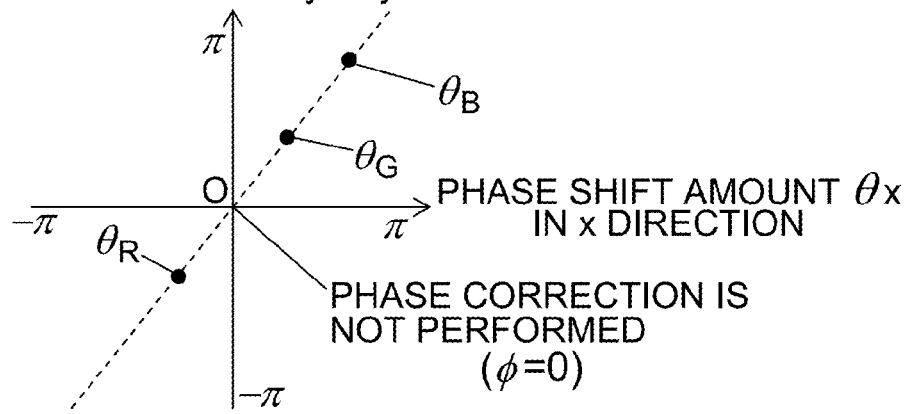
FIG. 6 is an explanatory diagram to describe the relationship between a phase shift amount and a phase correction amount that does not cause overcorrection in a case where the position shift directions of multiple colors are different.

The relationship between phase shift amount ($\theta_R$, $\theta_G$, $\theta_B$) of each color of multiple colors (R, G and B) in a specific spatial frequency and phase correction amount $\phi$ that does not cause overcorrection is described using FIGS. 5 and 6.

In FIGS. 5 and 6, the horizontal direction shows phase shift amount $\theta x$ in the x axis direction of image data, and the vertical direction shows phase shift amount $\theta y$ in the y axis direction of the image data. That is, in FIGS. 5 and 6, distance $\{\pm(\theta x^2+\theta y^2)^{1/2}\}$ from central point O corresponds to a position shift amount in an image surface in the real space.

Here, in FIG. 2, the image surface is a plane that corresponds to the image of the bidirectional two-dimensional in the direction of x and the direction of y (degraded image data and restored image data), and a plane corresponding to the imaging surface of the imaging element 16.

FIG. 5 illustrates a case where the position shift direction is identical (that is, the signs of phase shift amounts are identical) in all of multiple colors (R, G and B) in a certain specific spatial frequency ($\omega_x$, $\omega_y$).

In a case where the signs of phase shift amounts are identical in all of multiple colors as illustrated in FIG. 5, the complex conjugate of phase shift amount $\theta G$ of green (G) with the minimum absolute value is assumed as phase correction amount $\phi$ in a restoration filter. Since it is not possible to perform correction for each color in luminance system image data, it is assumed that phase correction is performed on phase shift amounts OR and AB of other colors (R and B) by same phase correction amount $\phi$. However, since the complex conjugate of minimum phase shift amount $\theta G$ among $\theta R$, $\theta G$ and AB is assumed as phase correction amount $\phi$, it is possible to prevent the position shift direction from varying before and after phase correction.

FIG. 6 illustrates a case where the position shift directions are different in multiple colors (R, G and B) (that is, a case where the signs of phase shift amounts are different) in a certain specific spatial frequency ($\omega_x$, $\omega_y$).

In a case where the signs of phase shift amounts are different in multiple colors as illustrated in FIG. 6, phase correction is not performed (phase correction amount $\phi=0$ is assumed). Since it is not possible to perform correction for each color in luminance system image data, the correction is not performed in a case where it is determined to be overcorrection. By this means, it is assumed that image data of better image quality than overcorrection is obtained.

Here, explanation is given by exemplifying a case where a phase correction amount is decided for each spatial frequency in the spatial frequency domain, but the phase correction amount may be decided for each position in an image surface in the real space region.

Moreover, whether to perform phase correction may be switched every luminance system image data.

<Switching Processing of Restoration Filter Generation>

Figure 7:
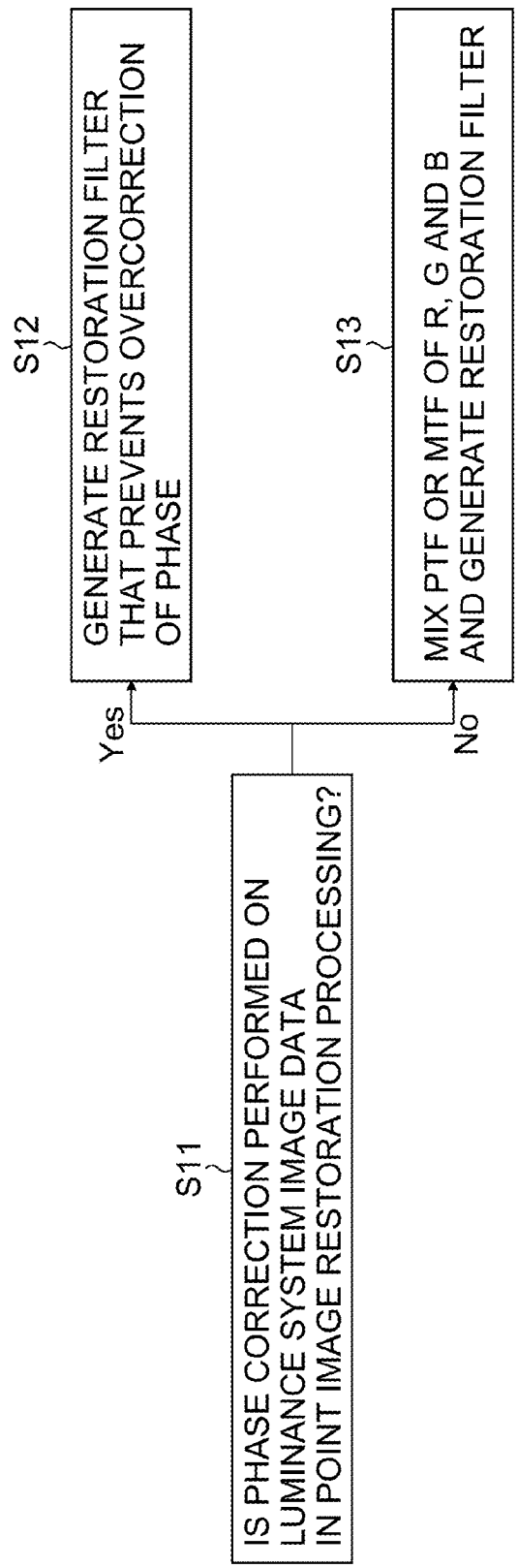
FIG. 7 is a flowchart illustrating the outline of switching processing as to the existence of phase correction execution.

FIG. 7 is a flowchart illustrating the outline of switching processing as to the existence of phase correction execution by the switching unit 86 of the restoration filter generation device 80 in FIG. 1.

In FIG. 7, the switching unit 86 determines whether to cause restoration filter F to perform phase correction (phase restoration) in point image restoration processing with respect to luminance system image data (step S11).

In a case where restoration filter F is caused to perform the phase correction (in the case of "Yes" in step S11), the restoration filter generation unit 84 generates a restoration filter which has a function to perform the phase correction in point image restoration processing with respect to luminance system image data and prevents overcorrection of the phase of the luminance system image data (step S12).

In a case where restoration filter F is not caused to perform the phase correction (in the case of "No" in step S11), the restoration filter generation unit 84 mixes transfer function information (PSF or MTF) on each color of multiple colors (R, G and B) between multiple colors, and, on the basis of the transfer function information (PSF or MTF) mixed between the multiple colors, generates a restoration filter that performs point image restoration processing that changes only the amplitude component without changing the phase component with respect to the luminance system image data (step S13). That is, the restoration filter generation unit 84 generates a restoration filter having a function to perform only amplitude correction (frequency correction) without performing phase correction in point image restoration processing with respect to the luminance system image data.

Here, since the frequency correction is not performed for each color of multiple colors (R, G and B) in the frequency correction with respect to the luminance system image data, there is a possibility that a lack of correction (MTF is less than 1.0) or overcorrection (MTF is greater than 1.0) occurs by any one or two or more colors of multiple colors (R, G and B). However, the restoration filter generation unit 84 mixes transfer function information (PSF or MTF) between multiple colors (R, G and B) and, on the basis of the mixed transfer function information (PSF or MTF), generates a restoration filter that performs frequency correction that averagely makes a modulation transfer function MTF close to "1". By this means, it becomes possible to generate an excellent restoration filter that suppresses a lack of correction and overcorrection. That is, since it is not necessary to respond to overcorrection by phase correction in a case where the phase correction is not performed, a restoration filter that performs point image restoration processing to change the amplitude component on luminance system image data without changing the phase component is generated on the basis of transfer function information mixed between multiple colors. By this means, it becomes possible to generate an excellent restoration filter.

First Embodiment

The restoration filter generation unit 84 in the first embodiment generates a restoration filter that selects a single-color phase shift amount whose absolute value is minimum, from the phase shift amounts of respective colors of multiple colors shown by transfer function information on respective colors of the optical system 14, and corrects the phase shift of luminance system image data by a phase correction amount corresponding to the selected single-color phase shift amount. By this means, a phase shift correction amount is suppressed such that phase correction with respect to the luminance system image data "is not overcorrection" in each color of multiple colors.

Here, as for "is not overcorrection", it means that "the absolute value of the phase correction amount that is a phase shift restoration amount does not exceed the absolute value of the phase shift amount". In the spatial frequency domain, it is preferable that it is not overcorrection in "each color of multiple colors and each spatial frequency". Moreover, in the real space, it is preferable that it is not overcorrection in "each color of multiple colors and each region of luminance system image data (each position in the image surface)".

In the following, a restoration filter generation processing example in a case where a phase correction amount is calculated on the basis of a phase transfer function (PTF) is specifically described. In this example, the phase shift amount of a single color is selected from the phase shift amounts of respective colors of multiple colors every spatial frequency ($\omega_x$, $\omega_y$).

Figure 8:
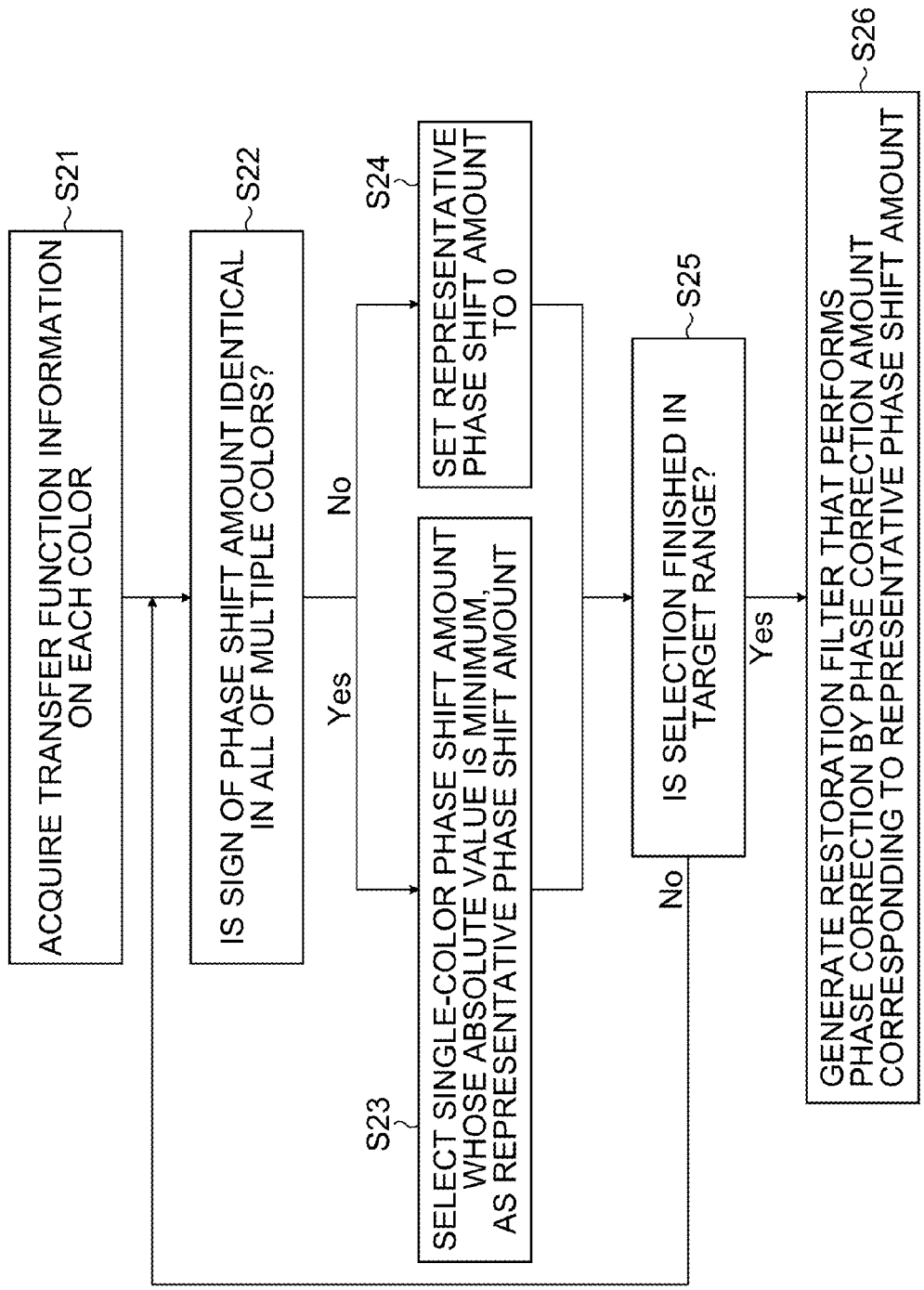
FIG. 8 is a flowchart of a restoration filter generation processing example in the first embodiment.

FIG. 8 is a flowchart illustrating the flow of a restoration filter generation processing example in the first embodiment.

First, transfer function information corresponding to point distribution in the optical system 14 is acquired by the information acquisition unit 82 for each color of multiple colors (R, G and B) (step S21). In this example, it is assumed that optical transfer function OTF including modulation transfer function MTF and phase transfer function PTF is acquired.

To simply give an explanation, phase transfer functions $PTF_R(\omega_x, \omega_y)$, $PTF_G(\omega_x, \omega_y)$ and $PTF_B(\omega_x, \omega_y)$ of respective colors of multiple colors (R, G and B) are defined as $PTF_K(\omega_x, \omega_y)$, where $KI \equiv \{R,G,B\}$ is established. Then, phase transfer function $PTFK(\omega_x, \omega_y)$ of each color is expressed by the following equation.

$$PTF_K(\omega_x,\omega_y)=e^{i\theta_K(\omega_x,\omega_y)}, -\pi \leq \theta_K(\omega_x,\omega_y) \leq \pi, K \in \{R,G,B\}$$ [Expression 1]

Here, $\theta_K(\omega_x, \omega_y)$ indicates the phase shift amount of each color of multiple colors (R, G and B). $PTF_K(\omega_x, \omega_y)$ in each color is a complex number with an absolute value of "1". The product of phase transfer function $PTF_K(\omega_x, \omega_y)$ of each color and modulation transfer function $MTF_K(\omega_x, \omega_y)$ of each color is optical transfer function $OTF_K(\omega_x, \omega_y)$ of each color that is a result of Fourier transform of point image distribution function $PSF_K(x,y)$ of each color.

The restoration filter generation unit 84 determines whether the sign (+/−) of phase shift amount $\theta_K(\omega_x, \omega_y)$ of each color is identical in all of multiple colors (R, G and B), every spatial frequency ($\omega_x$, $\omega_y$) (step S22).

In a case where the sign of phase shift amount $\theta_K(\omega_x, \omega_y)$ of each color is identical in all of multiple colors (R, G and B) (Yes in step S22), the restoration filter generation unit 84 selects phase shift amount $\theta_S(\omega_x, \omega_y)$ of a single color as shown in the following equation (step S23).

$$\theta_S(\omega_x,\omega_y)=\text{sign}(\theta_K(\omega_x,\omega_y)) \times \min \{|\theta_R(\omega_x,\omega_y)|, |\theta_G(\omega_x, \omega_y)|, |\theta_B(\omega_x,\omega_y)|\}$$ [Expression 2]

Here, "sign" indicates a signum function, where sign(x)={1:x>0, 0:x=0, −1:x<0} is established. Moreover, "min" indicates a function that calculates the minimum value.

That is, the restoration filter generation unit 84 selects the phase shift amount of a single color whose absolute value is minimum, from phase shift amount $\theta_K(\omega_x, \omega_y)=\{\theta_R(\omega_x, \omega_y), \theta_G(\omega_x, \omega_y), \theta_B(\omega_x, \omega_y)\}$ of each color of multiple colors (R, G and B), as $\theta_S(\omega_x, \omega_y)$, every spatial frequency ($\omega_x$, $\omega_y$).

Moreover, in a case where the sign of phase shift amount $\theta_K(\omega_x, \omega_y)$ is different in multiple colors (R, G and B) (No in step S22), the restoration filter generation unit 84 sets the phase correction amount to 0 by adopting 0 as phase shift amount $\theta_S(\omega_x, \omega_y)$ as shown in the following equation (step S24).

$$\theta_S(\omega_x,\omega_y)=0$$ [Expression 3]

The restoration filter generation unit 84 determines whether the selection processing in steps S22 to S24 is performed in all spatial frequencies ($\omega_x$, $\omega_y$) in a target range (step S25).

Phase transfer function $PTF_S(\omega_x, \omega_y)$ (which may be referred to as "representative phase transfer function" below) in the following equation is expressed by phase shift amount $\theta_S(\omega_x, \omega_y)$ (which may be referred to as "representative phase shift amount" below) calculated according to above-mentioned Expressions 2 and 3.

$$PTF_S(\omega_x,\omega_y)=e^{i\theta_S(\omega_x,\omega_y)}$$ [Expression 4]

The restoration filter generation unit 84 generates a restoration filter by calculating a filter coefficient so as to correct the phase shift of luminance system image data by a phase correction amount corresponding to the above-mentioned representative phase shift amount $\theta_S(\omega_x, \omega_y)$ (step S26). In other words, it can be said that the restoration filter generation unit 84 calculates a restoration filter phase characteristic on the basis of representative phase transfer function $PTF_S(\omega_x, \omega_y)$ and generates a restoration filter corresponding to the characteristic information.

In a case where the restoration filter is a Wiener filter, the phase characteristic (indicating "phase correction amount") of the Wiener filter is the complex conjugate of representative phase transfer function $PTF_S(\omega_x, \omega_y)$.

According to the restoration filter generation unit 84 in the present embodiment, a single-color phase shift amount whose absolute value is minimum is selected from phase shift amounts $\theta_R(\omega_x, \omega_y)$, $\theta_G(\omega_x, \omega_y)$ and $\theta_B(\omega_x, \omega_y)$ of respective colors of multiple colors shown by phase transfer functions $PTF_R(\omega_x, \omega_y)$, $PTF_G(\omega_x, \omega_y)$ and $PTF_B(\omega_x, \omega_y)$ of respective colors of multiple colors, and a restoration filter having a function to correct the phase shift of luminance system image data by a phase correction amount corresponding to the selected single-color phase shift amount is generated. Therefore, it is possible to easily generate a restoration filter that does not cause overcorrection in any color of multiple colors.

Moreover, in a case where the sign of a phase shift amount is different every color in the same spatial frequency (that is, in a case where the position shift direction of each color in the real space is different), it is possible to prevent phase correction from being performed. This is because it is not possible to perform movement in a different direction every color in luminance system image data. Here, in this case, based on transfer function information mixed between multiple colors, a restoration filter that performs point image restoration processing that changes the amplitude component on luminance system image data without changing the phase component may be generated.

Second Embodiment

The restoration filter generation unit 84 in the second embodiment includes an operation unit that calculates the filter coefficient of the restoration filter, assuming the number of taps of a restoration filter as an input parameter and assuming the absolute value of the phase correction amount of the restoration filter to be equal to or less than the absolute value of the phase shift amount in an optical system every spatial frequency. By this means, it is possible to surely prevent overcorrection from being caused even in a case where the number of taps is limited.

In the following, a restoration filter generation processing example in a case where the filter coefficient of a Wiener filter is operated as a restoration filter on the basis of a phase transfer function (PTF) in the optical system 14 is specifically described.

When the number of taps of the restoration filter is assumed as N×N, the filter coefficient of the restoration filter is expressed by matrix C with $c_{uv}$ as the elements of N rows and N columns. Moreover, complex frequency characteristic $f(\omega_x, \omega_y|C)$ of the restoration filter is expressed by the following equation.

$$f(\omega_x, \omega_y | C) = \sum_{u=-M}^{M} \sum_{v=-M}^{M} e^{-i(\omega_x u + \omega_y v)} c_{u+M+1, v+M+1} \quad \text{[Expression 5]}$$

Here, N is an odd number, where M=(N−1)/2 is assumed. "u" and "v" are indices of the row and the column respectively.

A Wiener filter as one example of the restoration filter is generated by calculating matrix C that minimizes functional J[C] with a condition of s.t. (such that) or less, as shown in the following equation.

$$\text{minimize } J[C] \text{ s.t.} \phi(\omega_x,\omega_y)\theta_K(\omega_x,\omega_y) \le 0, |\phi(\omega_x,\omega_y)| \le |\theta_K(\omega_x,\omega_y)|,$$
$$K \in \{R,G,B\} \quad \text{[Expression 6]}$$

Here, $\theta_K(\omega_x, \omega_y)$ indicates the phase shift amount of each color shown by phase transfer function $PTF_K$ of each color. Moreover, $\phi(\omega_x, \omega_y)$ indicates a phase correction amount with respect to luminance system image data of a restoration filter to be generated.

"s.t. or less" indicates a conditional expression showing a condition that phase correction with respect to the luminance system image data by the restoration filter is not overcorrection.

$\{\phi(\omega_x, \omega_y)\theta_K(\omega_x, \omega_y) \le 0\}$ in the first half of the above-mentioned conditional expression indicates a condition that calculates matrix C of a filter coefficient such that phase correction amount $\phi(\omega_x, \omega_y)$ with respect to luminance system image data of the restoration filter has a positive/negative sign opposite to phase shift amount $\theta_K(\omega_x, \omega_y)$ of each color of multiple colors (R, G and B) in the optical system. That is, phase correction is performed in a direction opposite to the phase shift in each color of multiple colors. However, in a case where the sign of phase shift amount $\theta_K(\omega_x, \omega_y)$ is different in multiple colors (R, G and B), phase correction amount $\phi(\omega_x, \omega_y)$ is set to 0.

Moreover, $\{|\phi(\omega_x, \omega_y)| \le |\theta_K(\omega_x, \omega_y)|\}$ in the second half of the conditional expression indicates a condition that calculates matrix C of the filter coefficient such that absolute value $|\phi(\omega_x, \omega_y)|$ of the phase correction amount of the restoration filter does not exceed absolute value $|\theta_K(\omega_x, \omega_y)|$ of the phase shift amount of each color of multiple colors (R, G and B) in the optical system.

Here, the relationship between complex frequency characteristic $f(\omega_x, \omega_y|C)$ of the restoration filter and phase correction amount $\phi(\omega_x, \omega_y)$ is shown by the following equation.

$$f(\omega_x,\omega_y|C)=A(\omega_x,\omega_y) \times e^{j\phi(\omega_x,\omega_y)}, -\pi \le \phi(\omega_x,\omega_y) \le \pi \quad \text{[Expression 7]}$$

Here, $A(\omega_x, \omega_y)$ indicates the amplitude correction amount of a restoration filter to be generated.

Moreover, for example, functional J[C] is expressed by the following equation.

Here, $A(\omega_x, \omega_y)$ indicates the amplitude correction amount of a restoration filter to be generated, and a constraint condition with respect to this is not described in the present invention. Moreover, for example, functional J[C] uses the minimization standard of a Wiener filter as shown in the following equation.

$$J[C] = \iint (|1-f(\omega_x,\omega_y|C) \text{OTF}_Y(\omega_x,\omega_y)|^2 S_Y(\omega_x,\omega_y) + |f(\omega_x,\omega_y|C)|^2 N_Y(\omega_x,\omega_y)) d\omega_x d\omega_y \quad \text{[Expression 8]}$$

Here, $\text{OTF}_Y(\omega_x, \omega_y)$, $S_Y(\omega_x, \omega_y)$ and $N_Y(\omega_x, \omega_y)$ indicate an optical transfer function, signal power and noise power corresponding to luminance system image data respectively. $\text{OTF}_Y$ indicates a product of modulation transfer function $\text{MTF}_Y$ corresponding to the luminance system image data and phase transfer function $\text{PTF}_Y$ corresponding to the luminance system image data. $\text{MTF}_Y$ is calculated on the basis of modulation transfer functions $\text{MTF}_R$, $\text{MTF}_G$ and $\text{MTF}_B$ of respective colors of multiple colors. $S_Y$ is calculated on the basis of signal power $S_R$, $S_G$ and $S_B$ of respective colors of multiple colors. $N_Y$ is calculated on the basis of noise power $N_R$, $N_G$ and $N_B$ of respective colors of multiple colors.

The restoration filter generation unit 84 in the present embodiment includes an operation unit that calculates the filter coefficient of a restoration filter, "assuming the number of taps of the restoration filter as an input parameter" and "assuming the absolute value of the phase correction amount of the restoration filter to be equal to or less than the absolute value of the phase shift amount in an optical system" every spatial frequency, and therefore it is possible to surely prevent overcorrection due to the existence of tap number limitation. If one of the phase shift amounts of respective colors of multiple colors is merely selected such that the phase shift amount is not overcorrected, there is a case where a problem occurs that a filter coefficient that causes overcorrection due to tap number limitation is actually calculated. However, by operating the filter coefficient of the restoration filter with a condition that the phase correction is not overcorrection, it is ensured that phase overcorrection is not caused. Here, the amount of operation increases since processing of non-linear optimization is performed at the time of filter generation, but the present embodiment is preferable from the viewpoint of overcorrection prevention in a case where the throughput of the operation unit is high.

Third Embodiment

The restoration filter generation unit 84 in the third embodiment generates a restoration filter that corrects the phase shift of luminance system image data by a phase correction amount corresponding to transfer function information on green (G). The information acquisition unit 82 acquires at least transfer function information on green (G) of multiple colors. The information acquisition unit 82 may acquire only transfer function information on green (G).

In general, an optical system of an imaging device is designed by attaching importance to green (G) that influences the visual characteristics most among multiple colors (R, G and B). Moreover, the phase shift amount of green (G) tends to be minimum only in a low spatial frequency which is visually important. Therefore, if a restoration filter is generated so as to adequately correct the phase shift amount of green (G) on the basis of only the phase shift amount shown by the transfer function information on green (G), it is possible to roughly prevent overcorrection even for the phase shifts of other colors (R and B) than green (G).

Especially, in the optical system 14, even in a case where the phase shift amount of green (G) is smaller than the phase shift amounts of other colors, it is preferable to correct the phase shift of luminance system image data by a phase correction amount corresponding to the transfer function information on green (G). That is, in the optical system 14, in a case where the phase shift amount of green (G) is smaller than the phase shift amounts of other colors, if a restoration filter is generated so as to adequately correct the phase shift amount of green (G), it is possible to prevent overcorrection even for the phase shifts of other colors (R and B) than green (G).

Moreover, since the phase correction function of a restoration filter is designed on the basis of only the transfer function information on green (G), it is not possible to completely prevent overcorrection. However, since it is possible to reduce the amount of operation, the present embodiment is preferable in a case where the throughput of the operation unit is low.

Fourth Embodiment

The information acquisition unit 82 in the present embodiment calculates optical transfer functions $\{OTF_R(x,y), OTF_G(x,y), OTF_B(x,y)\}$ of respective colors of R, G and B by performing Fourier transform of point image distribution functions $\{PSF_R(x,y), PSF_G(x,y), PSF_B(x,y)\}$ of respective colors of R, G and B. Phase transfer functions $\{PTF_R(\omega_x, \omega_y), PTF_G(\omega_x, \omega_y), PTF_B(\omega_x, \omega_y)\}$ of respective colors of R, G and B and amplitude transfer functions $\{MTF_R(\omega_x, \omega_y), MTF_G(\omega_x, \omega_y), MTF_B(\omega_x, \omega_y)\}$ of respective colors of R, G and B and are included in optical transfer functions $\{OTF_R(x,y), OTF_G(x,y), OTF_B(x,y)\}$.

Moreover, in a case where a restoration filter is not caused to perform phase correction, the restoration filter generation unit 84 in the present embodiment calculates amplitude transfer function $MTF_Y(\omega_x, \omega_y)$ corresponding to luminance system image data by mixing respective amplitude transfer functions $\{MTF_R(\omega_x, \omega_y), MTF_G(\omega_x, \omega_y), MTF_B(\omega_x, \omega_y)\}$ of images (R image, G image and B image) of respective colors of multiple colors obtained by imaging an object by the imaging unit 18 (imaging device), and calculates a filter coefficient (matrix x) on the basis of this amplitude transfer function $MTF_Y(\omega_x, \omega_{ys})$.

Specifically, first, as shown in the following equation, amplitude transfer function MTF corresponding to luminance system image data is calculated by mixing amplitude transfer functions $\{MTF_R(\omega_x, \omega_y), MTF_G(\omega_x, \omega_y), MTF_B(\omega_x, \omega_y)\}$ of respective colors of R, G and B by a linear sum using the weights of respective colors of R, G and B when the luminance system image data is generated from images of respective colors of R, G and B.

$$MTF_Y(\omega_x,\omega_y)=C_R \times MTF_R(\omega_x,\omega_y)+C_G \times MTF_G(\omega_x,\omega_y)+C_B \times MTF_B(\omega_x,\omega_y)$$ [Expression 9]

Here, since phase transfer functions $\{PTF_R(\omega_x, \omega_y), PTF_G(\omega_x, \omega_y), PTF_B(\omega_x, \omega_y)\}$ of respective colors of R, G and B are not used to calculate a filter coefficient in the present embodiment, they are deleted.

Next, the coefficient (matrix C) of a filter caused to correct the amplitude characteristic of the luminance system image data is calculated on the basis of amplitude transfer function $MTF_Y(\omega_x, \omega_y)$.

In the fourth embodiment, the filter coefficient is calculated using weights with respect to image data of respective colors of R, G and B at the time of luminance system image generation and the amplitude transfer functions of respective colors of R, G and B without using the phase transfer functions of respective colors of R, G and B, and therefore the filter coefficient is calculated by excluding information on a phase shift (phase correlation information) between colors of R, G and B.

<Lateral Chromatic Aberration Correction Support Processing>

In a case where the restoration processing unit 26 performs lateral chromatic aberration correction, it is preferable to perform the following lateral chromatic aberration correction support processing in the restoration filter generation device 80 described in the first to fourth embodiments.

The information acquisition unit 82 acquires lateral chromatic aberration correction information that shows whether to implement lateral chromatic aberration correction with respect to the image data of each color of multiple colors before luminance system image data is generated.

In the case of detecting that the lateral chromatic aberration correction is implemented in restoration processing on the basis of the lateral chromatic aberration correction information, the restoration filter generation unit 84 performs coordinate movement processing for a correction amount in the lateral chromatic aberration correction on transfer function information on respective colors acquired by the information acquisition unit 82, and mixes the transfer function information on respective colors after the coordinate movement processing between the colors as described in the third embodiment.

<Configuration Example of Digital Camera>

Figure 9:
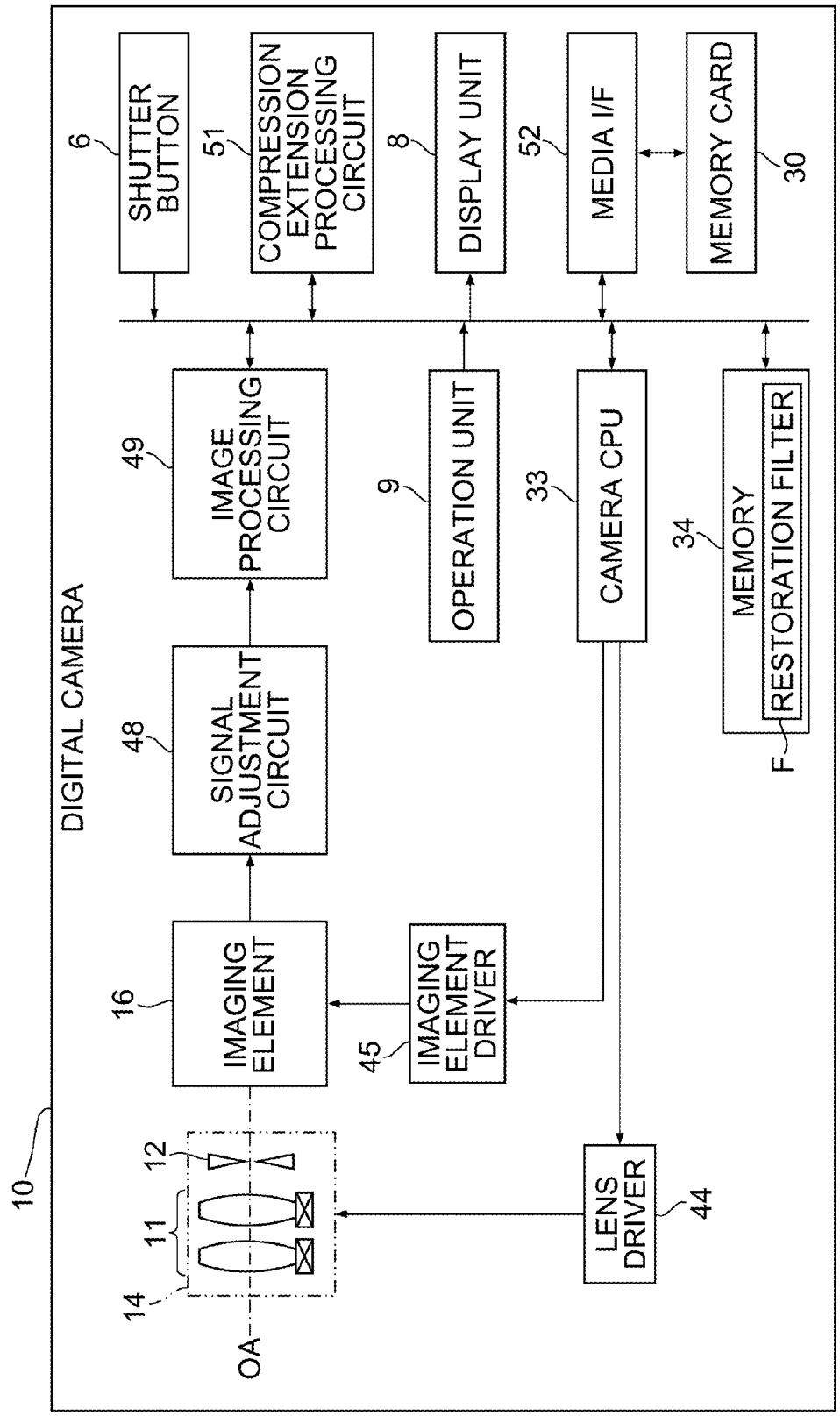
FIG. 9 is a block diagram illustrating a hardware configuration example of a digital camera.

FIG. 9 is a block diagram illustrating a hardware configuration example of the digital camera 10.

In FIG. 9, a camera CPU (CPU: Central Processing Unit) 33 sequentially performs various kinds of programs and data read from a memory 34 on the basis of an instruction input in an operation unit 9 and controls each unit of the digital camera 10 in an integral manner.

A memory 34 corresponding to the restoration filter storage unit 24 in FIG. 1 stores restoration filter F in addition to the above-mentioned various programs. Moreover, the memory 34 functions as a work memory to perform processing by a CPU 33 or a temporal storage destination of various kinds of data.

The single-plate color imaging element 16 is disposed behind the optical system 14. Multiple pixels disposed in a matrix manner in a predetermined pattern array (a Bayer array, a G stripe R/B full-checkered pattern, an X-Trans (registered trademark) array and a honeycomb array, and so on) are formed on the imaging surface of the imaging element 16. Each pixel includes a microlens, color filters (color filters of R (red), G (green) and B (blue) in this example) and a photodiode. The imaging element 16 and the optical system 14 form an imaging device in the present invention, and an object image formed on the imaging surface by the optical system 14 is converted into an electrical output signal and output. Here, various kinds of imaging elements such as a CCD (Charge Coupled Device) color imaging element and a CMOS (Complementary Metal Oxide Semiconductor) color imaging element are used as the imaging element 16. An imaging element driver 45 controls the drive of the imaging element 16 under the control of the CPU 33.

A signal adjustment circuit 48 performs various kinds of signal adjustment processing on the output signal output from the imaging element 16, and generates RGB mosaic image data R1, G1 and B1 according to a color filter array of the imaging element 16. Here, in a case where the imaging element 16 is a CCD type, for example, the signal adjustment circuit 48 includes a CDS/AGC (Correlated Double Sampling/Automatic Gain Control) circuit and an A/D conversion circuit, and so on, and, in a case where it is a CMOS type, for example, it includes an amplifier, and so on.

An image processing circuit 49 corresponds to the image processing device of the present invention. This image processing circuit 49 performs black level adjustment processing, white balance correction processing, gamma correction processing, demosaic processing, YC conversion processing and point image restoration processing, and so on, on the mosaic image data of each color of multiple colors R, G and B input from the signal adjustment circuit 48, and generates luminance system image data Y and color difference system image data Cb and Cr. Luminance system image data Y and color difference system image data Cb and Cr are temporarily stored in the VRAM (Video Random Access Memory) region of the memory 34 (the VRAM can be separately installed).

The VRAM region has a memory area for a live view image that stores two consecutive field images. Luminance system image data Y and color difference system image data Cb and Cr stored in the VRAM region are sequentially output to a display unit 8. By this means, a live view image is displayed on the display unit 8.

When a shutter button 6 is pressed in an imaging mode, a compression extension processing circuit 51 performs compression processing on luminance system image data Y and color difference system image data Cb and Cr stored in the VRAM region. Moreover, the compression extension processing circuit 51 performs extension processing on compressed image data obtained from a memory card 30 through a media I/F 52. The media I/F 52 records and reads the compressed image data for the memory card 30.

Figure 10:
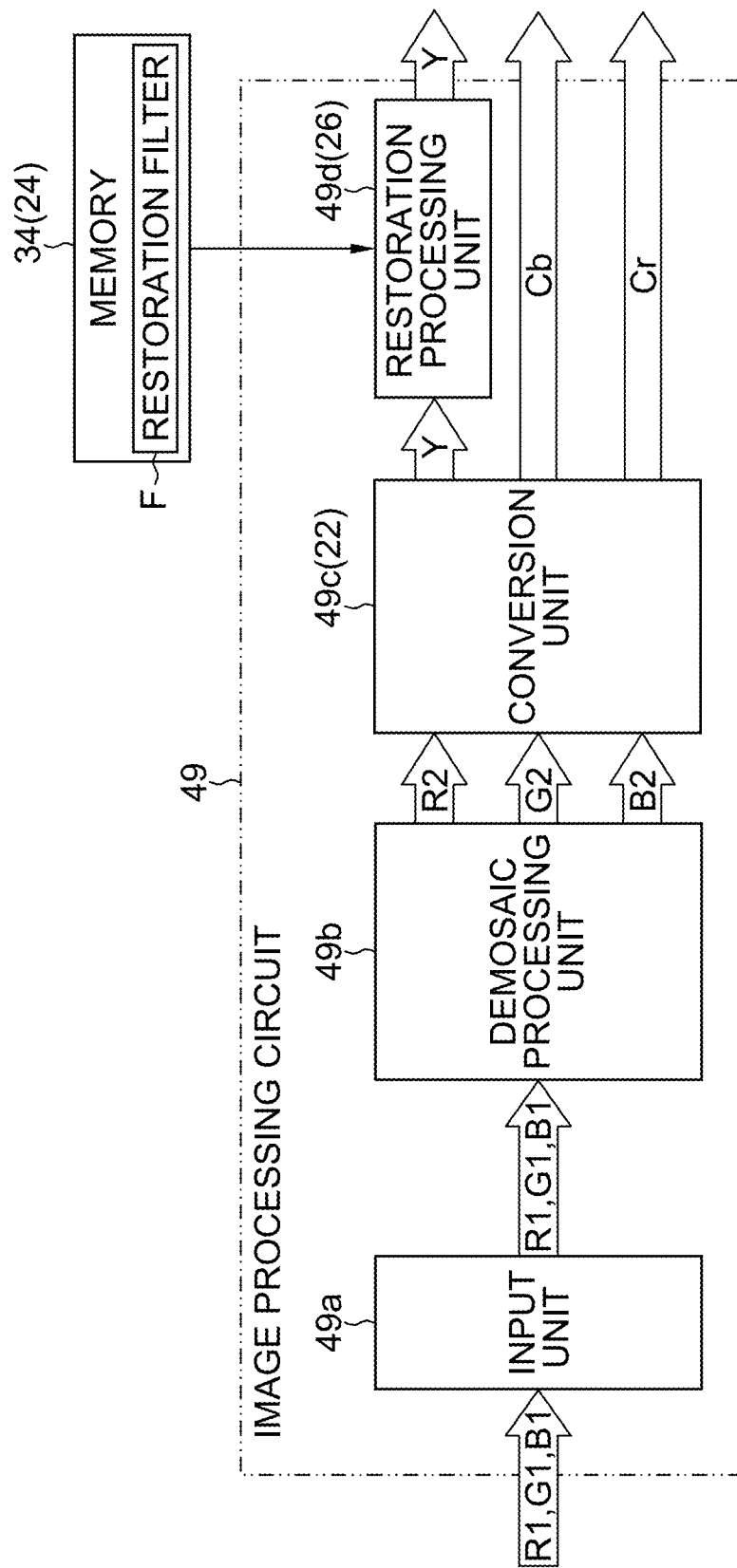
FIG. 10 is a block diagram illustrating a configuration example of the image processing circuit in FIG. 9.

As illustrated in FIG. 10, the image processing circuit 49 mainly includes an input unit 49a, a demosaic processing unit 49b, a conversion unit 49c (corresponding to the luminance system image data generation unit 22 in FIG. 1) and a restoration processing unit 49d (26 in FIG. 1). Here, the image processing circuit 49 includes correction processing units that perform white balance correction processing and gamma correction processing, and so on, but illustration and explanation of these correction processing units are omitted to prevent complication of explanation.

The input unit 49a outputs mosaic image data R1, G1 and B1 of respective colors of RGB input from the signal adjustment circuit 48 to the demosaic processing unit 49b. That is, the input unit 49a functions as an input I/F in which the image data of each color obtained by imaging by the imaging element 16 is input.

The demosaic processing unit 49b performs demosaic processing (which may be referred to as "synchronization processing") that calculates color information on all of RGB every pixel (conversion into a synchronous system) on the basis of mosaic image data R1, G1 and B1 of respective colors, and generates RGB image data R2, G2 and B2 including color data of three of RGB. The demosaic processing unit 49b outputs RGB image data R2, G2 and B2 to the conversion unit 49c.

The conversion unit 49c (luminance system image data generation unit 22) performs YC conversion processing on RGB image data R2, G2 and B2, and generates luminance system image data Y and color difference system image data Cb and Cr. For example, luminance system image data Y is generated according to equation [Y=0.3R+0.6G+0.1B]. Since the contribution rate of the G color becomes 60% in this equation, the G color has a higher contribution ratio than the R color (contribution rate of 30%) and the B color (contribution rate of 10%). Therefore, the G color is a color that contributes to a luminance signal most among three primary colors.

Here, explanation is given by exemplifying the value of a luminance signal of a color space shown by "Y, Cb, Cr" as luminance system image data Y in the present embodiment, but it is not especially limited as long as it is data that contributes to the luminance of an image. Luminance system image data Y means various kinds of data having information on the luminance of a taken image. As luminance system image data Y, for example, data with the highest contribution rate to obtain a luminance signal and data corresponding to a color filter of a color that contributes to luminance most, and so on, are enumerated.

The restoration processing unit 49d (26 in FIG. 1) reads restoration filter F stored in the memory 34 and performs restoration processing on luminance system image data Y using this restoration filter F. This restoration processing is performed only on luminance system image data Y with a large visual effect to decrease the load of operation processing. By performing point image restoration processing, image degradation (such as a blur) due to an aberration of the optical system 14 is corrected.

A point image (optical image) that penetrates the optical system 14 is formed on the imaging surface of the imaging element 16 as a large point image (blurred image) as shown as "degraded image data" in FIG. 1, but it is restored to a small point image (image of high resolution) as "restored image data" in FIG. 2 by point image restoration processing.

<Configuration Example of Restoration Filter Generation Device>

Figure 11:
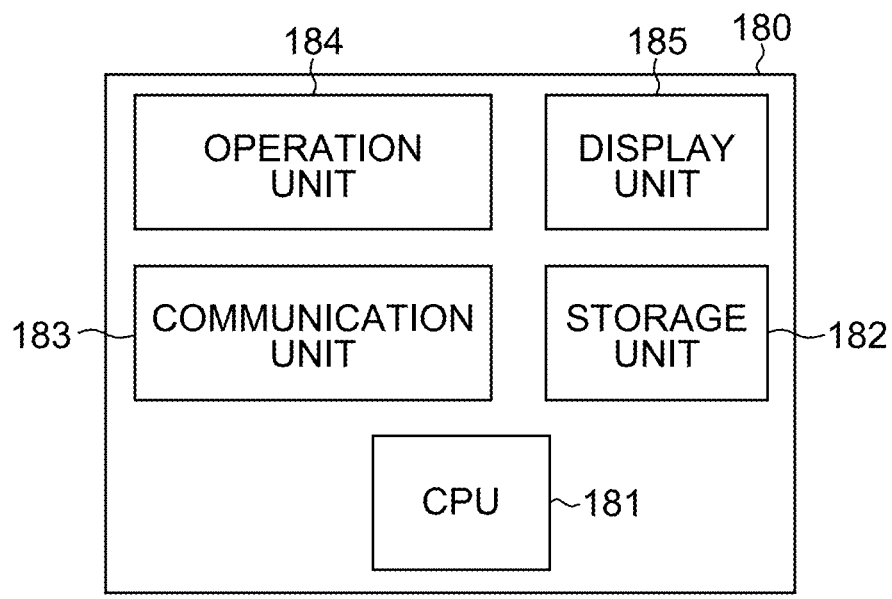
FIG. 11 is a block diagram illustrating a hardware configuration example of a restoration filter generation device.

FIG. 11 is a block diagram illustrating a hardware configuration example of a computer device 180 used as the restoration filter generation device 80.

In FIG. 11, a CPU (Central Processing Unit) 181 controls each unit of a computer device 180. A storage unit 182 stores a restoration filter generation processing program and transfer function information. A communication unit 183 performs communication with a server device (illustration is omitted) through a network and acquires transfer function information from the server device through the network. An operation unit 184 accepts an instruction input from an operator. A display unit 185 displays various kinds of information.

In the computer device 180 in FIG. 11, the communication unit 183 may form the information acquisition unit 82 in FIG. 1. Moreover, the switching unit 86 in FIG. 1 includes the CPU 181 (or the operation unit 184). Moreover, the restoration filter generation unit 84 in FIG. 1 includes the CPU 181.

<Variation of System>

Explanation is given by exemplifying a case where the restoration filter generation device 80 and the digital camera 10 as an image processing device are individually formed as illustrated in FIG. 1 in the above-mentioned embodiment, but the present invention is not limited to such a case.

Figure 12:
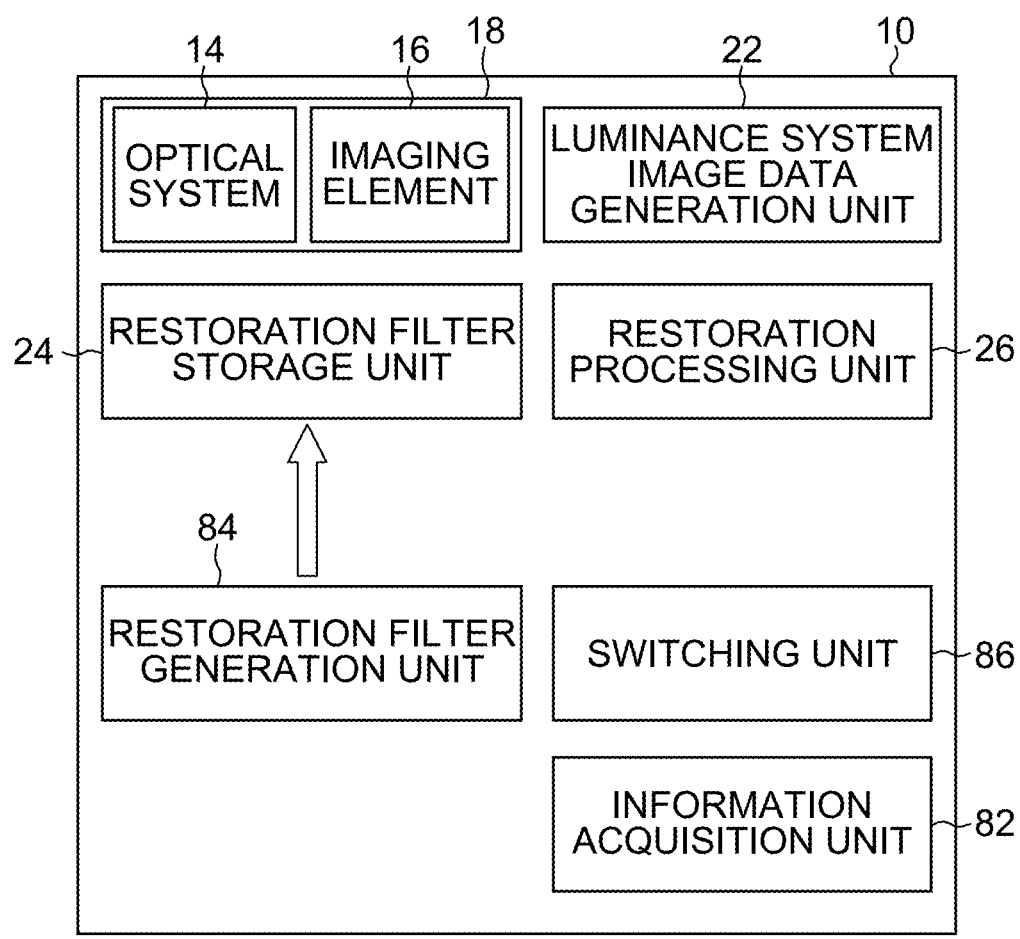
FIG. 12 is a block diagram of a digital camera that includes a restoration filter generation device and an image processing device.

As illustrated in FIG. 12, it may be a case where the digital camera 10 includes a restoration filter generation device and an image processing device. The digital camera 10 in FIG. 12 includes the information acquisition unit 82, the restoration filter generation unit 84 and the switching unit 86 which form the restoration filter generation device 80 in FIG. 1.

Figure 13:
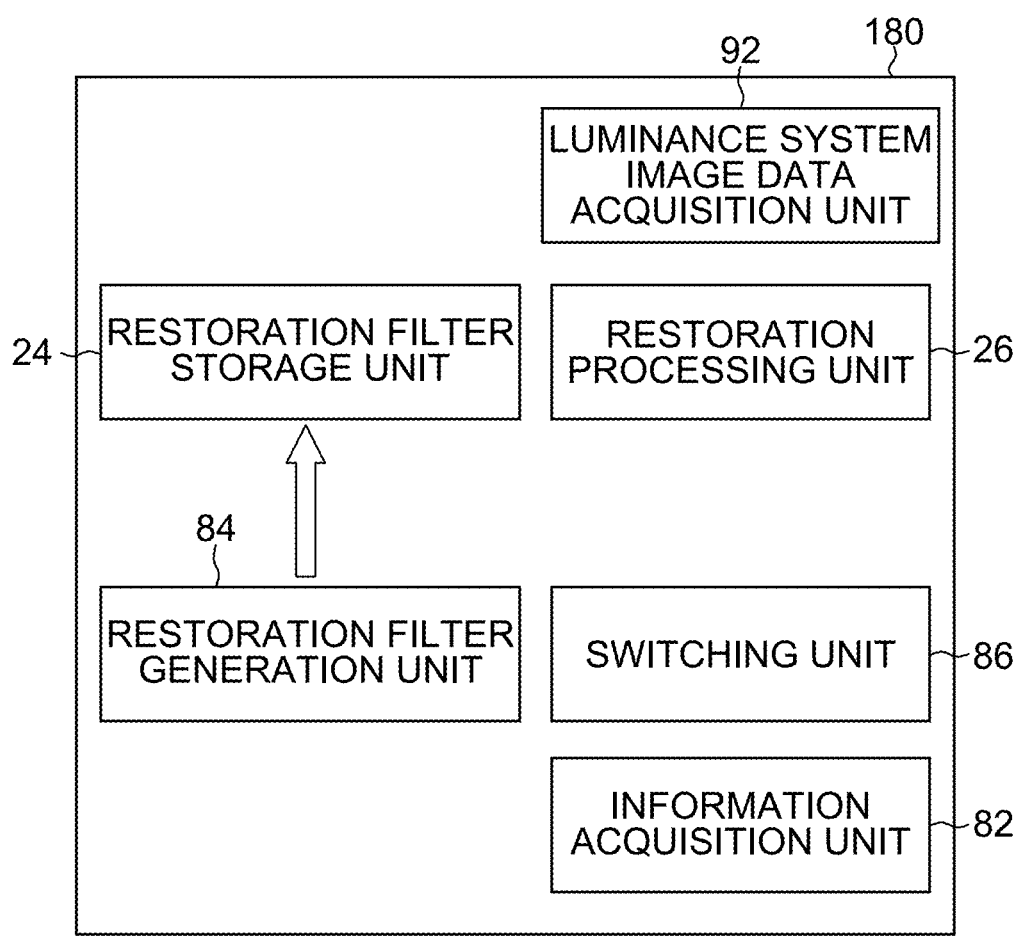
FIG. 13 is a block diagram of a computer device that includes a restoration filter generation device and an image processing device.

Moreover, as illustrated in FIG. 13, it may be a case where the computer device 180 (for example, the hardware configuration in FIG. 11) includes a restoration filter generation device and an image processing device. The computer device 180 in FIG. 13 includes the restoration filter storage unit 24 and the restoration processing unit 26 which form the digital camera 10 in FIG. 1, and a luminance system image data acquisition unit 92 that acquires luminance system image data. For example, the luminance system image data acquisition unit 92 includes the communication unit 183 in FIG. 11.

Here, the system configuration is not limited in the cases described in FIGS. 1, 12 and 13, and it may be other configurations. The restoration filter generation unit 84 and the restoration processing unit 26 may be installed in other devices such as a server device. For example, in a case where a server device includes the restoration processing unit 26, for example, it may be designed such that: image data is transmitted from the digital camera 10 or the computer device 180 to the server device; point image restoration processing is performed on this image data in the restoration processing unit 26 of the server device; and image data after the point image restoration (recovery image data) is transmitted/provided to a transmission source.

Moreover, a mode to which the present invention is applicable is not limited to a digital camera, a computer and a server. For example, it is applicable to mobile device equipment having other functions (telephone call function, communication function and other computer functions) than imaging in addition to an imaging function, besides camera equipment with imaging as a main function. As other modes to which the present invention is applicable, for example, there are portable telephones, smart phones, PDAs (Personal Digital Assistants) and portable game machines, and so on, which have a camera function. One example of a smart phone to which the present invention is applicable is described later in detail.

<Application Example to EDoF System>

Point image restoration processing (restoration processing) in the above-mentioned embodiment is image processing that restores an original object image by correcting image degradation due to an aberration of an optical system according to specific imaging conditions (for example, a diaphragm value, an F value, a focal distance and a lens kind, and so on), but restoration processing to which the present invention is applicable is not limited to the restoration processing in the above-mentioned embodiment. For example, the restoration processing according to the present invention is applicable to restoration processing with respect to image data imaged and acquired by an optical system (a lens and a diaphragm, and so on) having EDoF (Extended Depth of Field (Focus)). By performing restoration processing on image data of a blurred image taken and acquired in a state where the depth of field (depth of focus) is extended by an EDoF optical system, it is possible to restore and generate image data of high resolution in a state where focusing is performed in a wide range. In this case, restoration processing is performed using a restoration filter which is based on transfer function information (PSF, OTF, MTF and PTF, and so on) on the EDoF optical system and which has a filter coefficient set such that excellent image restoration becomes possible in the range of the extended depth of field (depth of focus).

In the following, one example of a system (EDoF system) related to the restoration of image data imaged and acquired through the EDoF optical system is described. Here, in the following example, an example of performing restoration processing on luminance system image data obtained from image data (RGB data) after demosaic processing is described.

Figure 14:
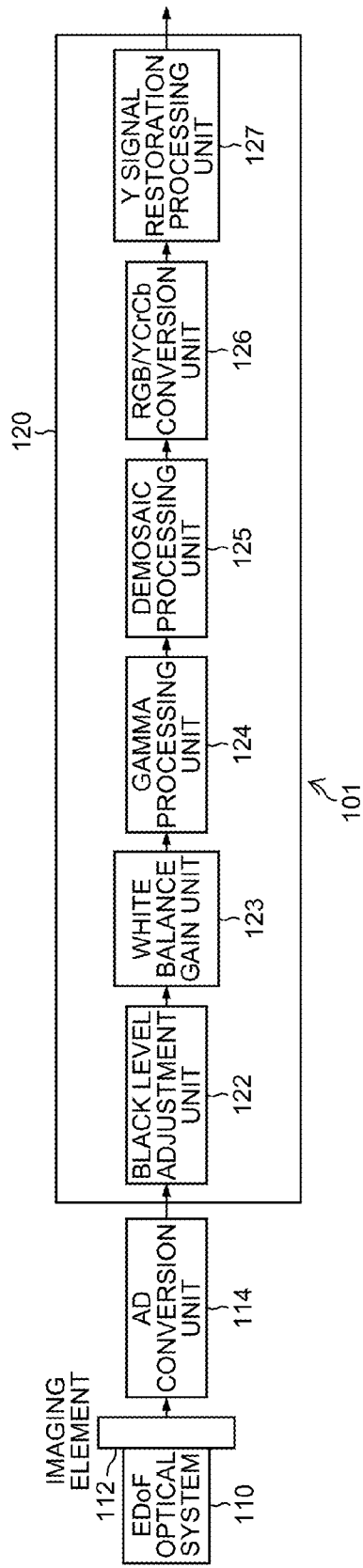
FIG. 14 is a block diagram illustrating one mode of an imaging module including an EDoF optical system.

FIG. 14 is a block diagram illustrating one mode of an imaging module 101 including the EDoF optical system. The imaging module (a digital camera, and so on) 101 of this example includes an EDoF optical system 110 (optical system), an imaging element 112, an AD conversion unit 114 and an image processing unit 120.

Figure 15:
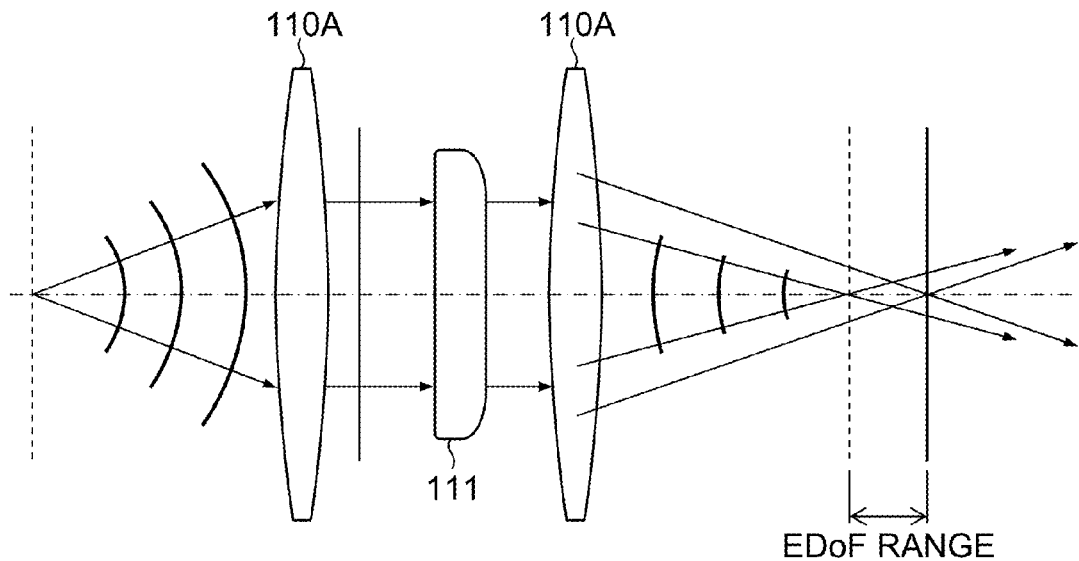
FIG. 15 is a diagram illustrating one example of an EDoF optical system.

FIG. 15 is a diagram illustrating one example of the EDoF optical system 110. The EDoF optical system 110 of this example includes an imaging lens 110A with fixed single focus and an optical filter 111 disposed in a pupil position. The optical filter 111 modulates a phase and forms (achieves EDoF of) the EDoF optical system 110 (the optical system 14 in FIG. 1) such that the extended depth of field (depth of focus) (EDoF) is obtained. Thus, the imaging lens 110A and the optical filter 111 form a lens that modulates the phase and extends the depth of field.

Here, the EDoF optical system 110 includes other components according to the necessity, and, for example, a diaphragm (illustration is omitted) is disposed near the optical filter 111. Moreover, one optical filter 111 may be provided or multiple ones may be combined and provided. Moreover, the optical filter 111 is merely one example of an optical phase modulation device, and the achievement of EDoF of the EDoF optical system 110 (the imaging lens 110A) may be realized by other devices. For example, the achievement of EDoF of the EDoF optical system 110 may be realized by the imaging lens 110A whose lens is designed so as to have a function equal to the optical filter 111 of this example instead of installing the optical filter 111.

That is, the achievement of EDoF of the EDoF optical system 110 can realized by various kinds of devices to change the wavefront of image formation on the light receiving surface of the imaging element 112. For example, "an optical element with changed thickness", "an optical element with a changed refractive index (a refractive distribution type wavefront modulation lens, and so on)", "an optical element with changed thickness or refractive index by coding to a lens surface, and so on (a wavefront modulation hybrid lens and an optical element formed on a lens surface as a phase surface)" and "a liquid crystal element (a liquid crystal spatial phase modulation element, and so on) that can modulate the phase distribution of light" can be adopted as a EDoF achievement device of the EDoF optical system 110. Thus, the present invention is applicable to not only a case where image formation that regularly disperses by an optical wavefront modulation element (the optical filter 111 (phase plate)) is possible but also a case where dispersion images similar to the case of using the optical wavefront modulation element can be formed on the imaging lens 110A itself without using the optical wavefront modulation element.

The EDoF optical system 110 of this example can be miniaturized since a focusing adjustment mechanism that mechanically performs focusing adjustment can be omitted, and it can be suitably mounted to a camera-equipped mobile phone and a portable information terminal.

An optical image after passing through the EDoF optical system 110 subjected to EDoF is formed on the imaging surface of the imaging element 112 illustrated in FIG. 14 and converted into an electrical signal here.

The imaging element 112 has basically the same configuration as the imaging element 16 of each above-mentioned embodiment. The imaging element 112 converts object light formed on the imaging surface by the EDoF optical system 110 into a signal corresponding to the incident ray volume, and outputs an analog RGB image signal.

The AD conversion unit 114 changes an analog RGB image signal output from the imaging element 112 into digital mosaic image data of each color of R, G, and B. The mosaic image data of each color is input in the image processing unit 120.

For example, the image processing unit 120 includes a black level adjustment unit 122, a white balance gain unit 123, a gamma processing unit 124, a demosaic processing unit 125, an RGB/YCrCb conversion unit 126 and a Y signal restoration processing unit 127 (restoration processing unit).

The black level adjustment unit 122 performs black level adjustment on the mosaic image data of each color output from the AD conversion unit 114. A known method can be adopted for black level adjustment. For example, in the case of paying attention to a certain effective photoelectric conversion element, the average of signals for dark current amount acquisition respectively corresponding to multiple OB photoelectric conversion elements included in a photoelectric conversion element line including the effective photoelectric conversion element is calculated, and the average is subtracted from a signal for dark current amount acquisition corresponding to the effective photoelectric conversion element. By this means, black level adjustment is performed.

The white balance gain unit 123 performs gain adjustment corresponding to the white balance gain of each of RGB color signals included in the mosaic image data in which black level data is adjusted.

The gamma processing unit 124 performs gamma correction that performs tone correction of a half tone or the like such that the mosaic image data of each color subjected to white balance adjustment becomes a preferable gamma characteristic.

The demosaic processing unit 125 performs demosaic processing on the mosaic image data of each color after gamma correction, and outputs RGB image data including color data of three of R, G and B.

The RGB/YCrCb conversion unit 126 is basically the same as the luminance system image data generation unit 22 of each above-mentioned embodiment, performs YC conversion processing on color data of three of R, G and B output from the demosaic processing unit 125, and generates and outputs luminance system image data Y and color difference system image data Cr and Cb.

The Y signal restoration processing unit 127 performs restoration processing on luminance system image data Y from the RGB/YCrCb conversion unit 126 on the basis of a restoration filter stored beforehand. For example, the restoration filter includes a deconvolution kernel (corresponding to the number of taps of M=7 and N=7, for example) having a kernel size of 7×7 and an operation coefficient (corresponding to restoration gain data and a filter coefficient) corresponding to the deconvolution kernel, and is used for deconvolution processing (deconvolution operation processing) for the phase modulation of the optical filter 111. Here, as for the restoration filter, what corresponds to the optical filter 111 is stored in an unillustrated memory. Moreover, the kernel size of the deconvolution kernel is not limited to the one of 7×7.

Figure 16:
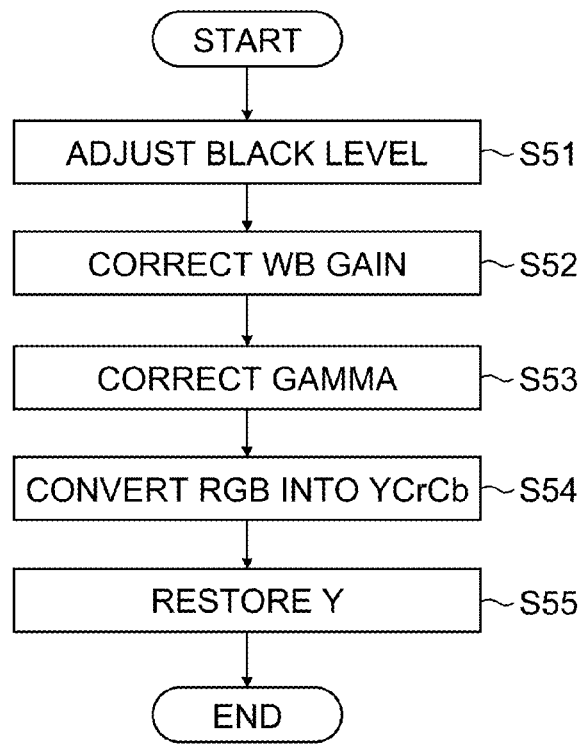
FIG. 16 is a flowchart illustrating one example of restoration processing in a restoration processing unit of a digital camera including an EDoF optical system.

Next, restoration processing by the image processing unit 120 is described using the flowchart illustrated in FIG. 16.

The mosaic image data of each color is input from the AD conversion unit 114 into one input of the black level adjustment unit 122 and black level data is input in the other input. The black level adjustment unit 122 subtracts the black level data from the mosaic image data of each color and outputs the mosaic image data of each color after this subtraction processing to the white balance gain unit 123 (step S51). By this means, the black level component is not included in the mosaic image data of each color.

Processing by the white balance gain unit 123 and the gamma processing unit 124 is sequentially performed on the mosaic image data of each color after black level adjustment (steps S52 and S53).

After the mosaic image data of each color subjected to gamma correction is subjected to demosaic processing in the demosaic processing unit 125, it is converted into luminance system image data Y and color difference system image data Cr and Cb in the RGB/YCrCb conversion unit 126 (step S54).

The Y signal restoration processing unit 127 performs restoration processing that performs deconvolution processing for the phase modulation of the optical filter 111 of the EDoF optical system 110 on luminance signal Y (step S55). That is, the Y signal restoration processing unit 127 performs deconvolution processing (deconvolution operation processing) of a luminance signal (here, a luminance signal of 7×7 pixels) corresponding to a pixel group of a predetermined unit centering on an arbitrary processing target pixel and a restoration filter (a 7×7 convolution kernel and the operation coefficient) stored beforehand in a memory or the like. The Y signal restoration processing unit 127 performs restoration processing that removes an image blur of the entire image by repeating deconvolution processing every pixel group of this predetermined unit so as to cover the entire area of the imaging surface. The restoration filter is defined according to the position of the center of pixel groups on which the deconvolution processing is performed. That is, a common restoration filter is applied to adjacent pixel groups. Further, it is preferable that a common restoration filter in all pixel groups is applied to simplify the restoration processing.

A point image (optical image) of a luminance signal after passing through the EDoF optical system 110 is formed on the imaging element 112 as a large point image (blurred image), but it is restored to a small point image (image of high resolution) by the deconvolution processing in the Y signal restoration processing unit 127.

As mentioned above, by performing restoration processing on luminance system image data after demosaic processing, it is not necessary to provide parameters of the restoration processing for each of RGB, and it is possible to speed up the restoration processing. Moreover, instead of arranging R, G and B image signals corresponding to R, G and B pixels in scattered positions in one unit respectively and performing deconvolution processing, luminance signals of adjacent pixels are arranged in a predetermined unit and a common restoration filter is applied to the unit to perform deconvolution processing, and therefore the accuracy of restoration processing improves. Here, color difference system image data Cr and Cb are allowed in image quality even if the resolution is not increased by the restoration processing in view of the visual characteristics by person's eyes. Moreover, since color difference system image data Cr and Cb are compressed at higher compressibility than luminance system image data Y in a case where an image is recorded in a compressed format like JPEG (Joint Photographic Experts Group), it is less necessary to increase the resolution by the restoration processing. Thus, it is possible to realize both of the improvement of restoration accuracy and the simplification and speeding up of processing.

The point image restoration processing according to each embodiment of the present invention is applicable even to restoration processing in the EDoF system described above.

In this case, the restoration filter generation device of each above-mentioned embodiment generates a restoration filter having a filter coefficient which is set such that excellent image restoration is possible within the range of the extended depth of field (depth of focus), on the basis of transfer function information on an EDoF optical system.

<Configuration of Smart Phone>

A digital camera and a computer device are exemplified as the image processing device and the imaging device of the present invention in each above-mentioned embodiment, but, for example, the present invention is also applicable to a portable telephone, a smart phone, a PDA (Personal Digital Assistants), a tablet terminal and a portable game machine, which have an imaging function. In the following, a smart phone is enumerated as an example and detailed explanation is given with reference to the drawings.

Figure 17:
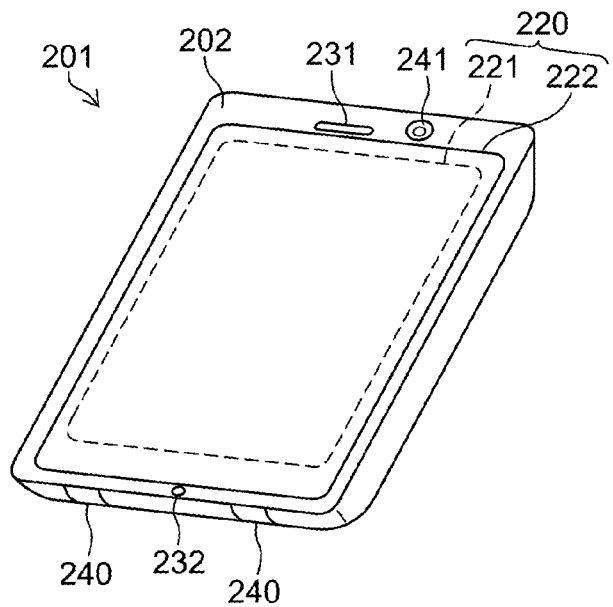
FIG. 17 is an outline drawing of a smart phone.

FIG. 17 illustrates the appearance of a smart phone 201 which is one embodiment of the image capturing apparatus of the present invention. The smart phone 201 illustrated in FIG. 17 has a tubular chassis 202, and includes a display input unit 220 in which a display panel 221 as a display unit on one surface of the chassis 202 and an operation panel 222 as an input unit are unified. Moreover, the chassis 202 includes a speaker 231, a microphone 232, an operation unit 240 and a camera unit 241. Here, the configuration of the chassis 202 is not limited to this. For example, it is possible to adopt a configuration in which the display unit and the input unit are independent or a configuration having a folded structure or a sliding mechanism.

Figure 18:
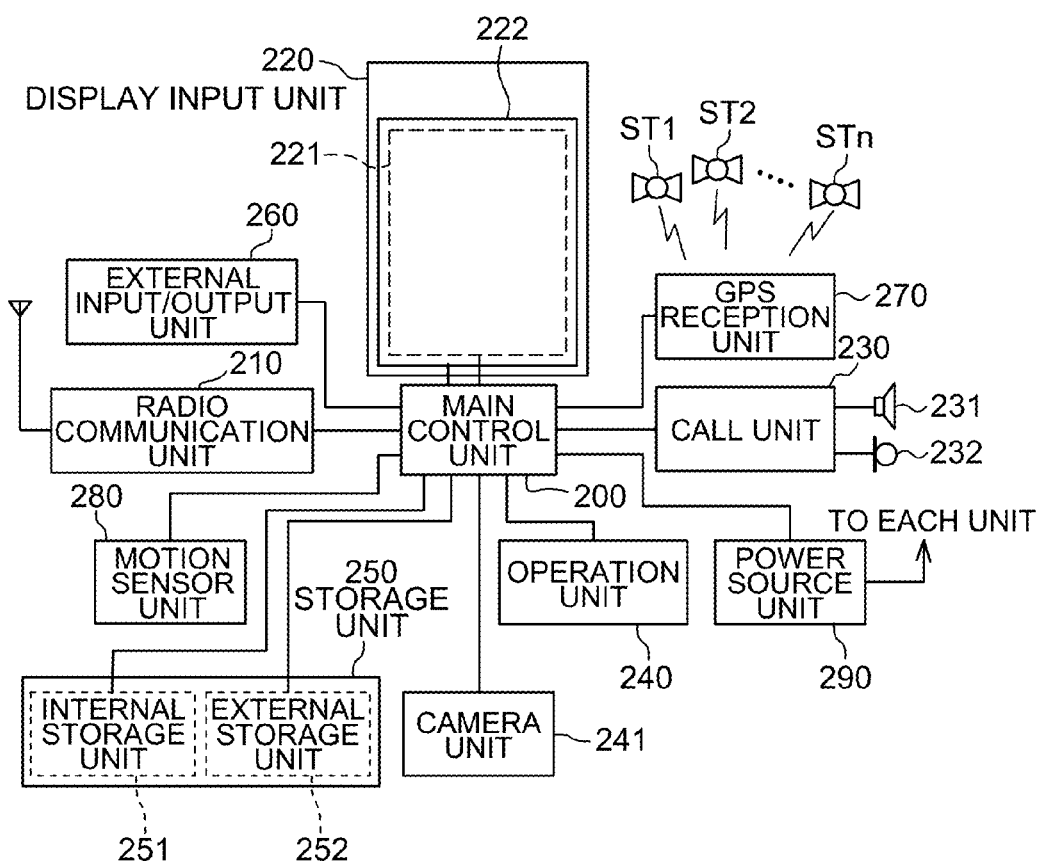
FIG. 18 is a block diagram illustrating the composition of the smart phone illustrated in FIG. 17.

FIG. 18 is a block diagram illustrating the configuration of the smart phone 201 illustrated in FIG. 17. As illustrated in FIG. 18, as main components of the smart phone, a radio communication unit 210, the display input unit 220, a call unit 230, the operation unit 240, the camera unit 241, a storage unit 250, an external input/output unit 260, a GPS (Global Positioning System) reception unit 270, a motion sensor unit 280, a power source unit 290 and a main control unit 200 are included. Moreover, as a main function of the smart phone 201, a radio communication function to perform mobile radio communication through base station device BS and mobile communication network NW is included.

The radio communication unit 210 performs radio communication with base station apparatus BS accommodated in mobile communication network NW according to an instruction of the main control unit 200. By using the radio communication, various kinds of file data such as audio data and image data and email data are transmitted and received or web data and streaming data, and so on, are received.

The display input unit 220 is a so-called touch panel that displays images (still image and moving image) and character information, and so on, visually conveys information to the user and detects a user operation with respect to the displayed information according to the control of the main control unit 200, and includes the display panel 221 and the operation panel 222.

Regarding the display panel 221, an LCD (Liquid Crystal Display) or an OELD (Organic Electro-Luminescence Display) is used as a display device. The operation panel 222 is a device which is placed such that an image displayed on the display surface of the display panel 221 is visualized, and which is operated by user's finger or stylus or which detects multiple coordinates. When the device is operated by user's finger or stylus, a generated detection signal due to the operation is output to the main control unit 200. Next, the main control unit 200 detects the operation position (coordinates) on the display panel 221 on the basis of the received detection signal.

As illustrated in FIG. 17, the display panel 221 and the operation panel 222 of the smart phone 201 exemplified as one embodiment of the image capturing apparatus of the present invention form the display input unit 220 in a unified fashion, but they are disposed such that the operation panel 222 completely covers the display panel 221. In a case where the disposition is adopted, the operation panel 222 may include a function to detect a user's operation even in an area outside the display panel 221. In other words, the operation panel 222 may include a detection area about an overlapping part that overlaps with the display panel 221 (hereafter referred to as a display area) and a detection area about the remaining outer edge part that does not overlap with the display panel 221 (hereafter referred to as a non-display area).

Here, the size of the display area and the size of the display panel 221 may be completely matched, but both of them do not have to be necessarily matched. Moreover, the operation panel 222 may include two response areas of the outer edge part and the remaining inner side part. In addition, the width of the outer edge part is arbitrarily designed according to the size of the chassis 202, and so on. Furthermore, as a position detection scheme adopted in the operation panel 222, there are a matrix switch scheme, a resistance film scheme, a surface elastic wave scheme, an infrared ray scheme, an electromagnetic induction scheme and an electrostatic capacitance scheme, and so on, and any scheme can be adopted.

The call unit 230 includes the speaker 231 and the microphone 232, converts user's voice input through the microphone 232 into voice data that can be processed in the main control unit 200 and outputs it to the main control unit 200, or decodes voice data received by the radio communication unit 210 or the external input/output unit 260 and outputs it from the speaker 231. Moreover, as illustrated in FIG. 17, for example, the speaker 231 can be mounted to the same surface as a surface in which the display input unit 220 is installed. Moreover, the microphone 232 can be mounted to the side surface of the chassis 202.

The operation unit 240 is a hardware key that uses a key switch, and so on, and accepts an instruction from the user. For example, as illustrated in FIG. 17, the operation unit 240 is mounted to the side surface of the chassis 202 of the smart phone 201. The operation unit 240 is a push-button switch which is turned on when being pressed by a finger or the like and which gets in an OFF state by the restorative force of a spring or the like when the finger is released.

The storage unit 250 stores a control program or control data of the main control unit 200, application software, address data associated with the name or telephone number of a communicating party, data of transmitted and received email, web data downloaded by web browsing and downloaded content data, or temporarily stores streaming data. Moreover, the storage unit 250 includes an internal storage unit 251 incorporated in the smart phone and an external storage unit 252 having a detachable external memory slot. Here, each of the internal storage unit 251 and the external storage unit 252 forming the storage unit 250 is realized using a storage medium such as a memory of a flash memory type, hard disk type, multimedia card micro type or card type (for example, Micro SD (registered trademark) memory, and so on), a RAM (Random Access Memory) and a ROM (Read Only Memory).

The external input/output unit 260 plays the role of an interface with all external equipment coupled with the smart phone 201, and directly or indirectly connects with other external equipment by communication or the like (for example, a universal serial bus (USB) and IEEE1394, and so on) or a network (such as the Internet, wireless LAN (Local Area Network), Bluetooth (registered trademark), RFID (Radio Frequency Identification), infrared communication (infrared data association: IrDA) (registered trademark), UWB (Ultra Wideband) (registered trademark) and ZigBee (registered trademark), and so on).

As external equipment coupled with the smart phone 201, for example, there are a wired/wireless headset, a wired/wireless external battery charger, a wired/wireless data port, a memory card or SIM (Subscriber Identity Module Card)/UIM (User Identity Module Card) card connected through a card socket, external audio/video equipment connected through an audio/video I/O (Input/Output) terminal, external audio/video equipment connected by wireless, a smart phone connected by wire/wireless, a personal computer connected by wire/wireless, a PDA connected by wire/wireless, a personal computer connected by wire/wireless, and earphones, and so on. The external input/output unit 260 may transmit data received from such external equipment, to each component in the smart phone 201, or transmit data in the smart phone 201 to the external equipment.

The GPS reception unit 270 receives GPS signals transmitted from GPS satellites ST1 to STn according to an instruction of the main control unit 200, performs positioning operation processing based on multiple received GPS signals and detects a position formed with the latitude, longitude and altitude of the smart phone 201. The GPS reception unit 270 can detect the position by using position information when the position information can be acquired from the radio communication unit 210 or the external input/output unit 260 (for example, wireless LAN).

The motion sensor unit 280 includes an acceleration sensor of three axes, for example, and detects the physical movement of the smart phone 201 according to an instruction of the main control unit 200. By detecting the physical movement of the smart phone 201, the movement direction and acceleration of the smart phone 201 are detected. The detection result is output to the main control unit 200.

The power source unit 290 supplies power accumulated in a battery (not illustrated) to each part of the smart phone 201 according to an instruction of the main control unit 200.

The main control unit 200 includes a microprocessor, performs operation according to a control program or control data stored in the storage unit 250, and integrally controls each part of the smart phone 201. Moreover, in order to perform voice communication or data communication through the radio communication unit 210, the main control unit 200 includes a mobile communication control function to control each part of a communication system and an application processing function.

The application processing function is realized when the main control unit 200 performs operation according to the application software stored in the storage unit 250. As the application processing function, for example, there are an infrared communication function to control the external input/output unit 260 and perform data communication with facing equipment, an email function to transmit and receive email, and a web browsing function to browse web pages, and so on.

Moreover, the main control unit 200 includes an image processing function to display an image on the display input unit 220, and so on, on the basis of image data (data of a still image or moving image) such as reception data and downloaded streaming data. The image processing function denotes a function that the main control unit 200 decodes the above-mentioned image data, performs image processing on the decoding result and displays an image on the display input unit 220.

In addition, the main control unit 200 performs display control with respect to the display panel 221 and operation detection control to detect a user operation through the operation unit 240 and the operation panel 222.

By the execution of the display control, the main control unit 200 displays an icon to activate application software and a software key such as a scrollbar, or displays a window to create email. Here, the scrollbar denotes a software key to receive an instruction to move a display part of an image, regarding a large image that cannot be settled in the display area of the display panel 221, and so on.

Moreover, by the execution of the operation detection control, the main control unit 200 detects a user operation through the operation unit 240, accepts an operation with respect to the above-mentioned icon or the input of a character string with respect to an input column of the above-mentioned window through the operation panel 222, or accepts a scroll request of a display image through the scrollbar.

In addition, by the execution of the operation detection control, the main control unit 200 includes a touch panel control function to: determine whether the operation position with respect to the operation panel 222 is an overlapping part (display area) that overlaps with the display panel 221 or it is the remaining outer edge part (non-display area) that does not overlap with the display panel 221; and control a reaction area of the operation panel 222 and the display position of the software key.

Moreover, the main control unit 200 can detect a gesture operation with respect to the operation panel 222 and execute a preset function according to the detected gesture operation. The gesture operation is not a conventional simple touch operation and means an operation to draw a trajectory by a finger, and so on, specify multiple positions at the same time or combine these to draw a trajectory of at least one of multiple positions.

The camera unit 241 is a digital camera that takes an electronic image by using an imaging element such as a CMOS (Complementary Metal Oxide Semiconductor) and a CCD (Charge-Coupled Device). Moreover, by the control of the main control unit 200, the camera unit 241 can convert image data acquired by imaging into compressed image data such as JPEG (Joint Photographic coding Experts Group), for example, record it in the storage unit 250 and output it through the input/output unit 260 or the radio communication unit 210. In the smart phone 201 illustrated in FIG. 17, the camera unit 241 is mounted to the same surface as the display input unit 220, but the mounting position of the camera unit 241 is not limited to this. For example, the camera unit 241 may be mounted to the back surface of the display input unit 220 or multiple camera units 241 may be mounted. Here, in a case where multiple camera units 241 are mounted, it is possible to switch the camera unit 241 for imaging and use it alone to take an image, or take images by using multiple camera units 241 at the same time.

Moreover, the camera unit 241 can be used for various kinds of functions of the smart phone 201. For example, it is possible to display an image acquired in the camera unit 241 on the display panel 221 or use the image of the camera unit 241 as one of operation inputs of the operation panel 222. Moreover, when the GPS reception unit 270 detects a position, it is possible to detect the position with reference to the image from the camera unit 241. Furthermore, with reference to the image from the camera unit 241, it is possible to determine the optical axis direction of the camera unit 241 of the smart phone 201 and determine the current usage environment without using the acceleration sensor of three axes or with using the acceleration sensor of three axes together. Naturally, it is possible to use the image from the camera unit 241 in application software.

Additionally, it is possible to attach position information acquired by the GPS reception unit 270, voice information (which may be text information by performing voice text conversion by the main control unit, and so on) acquired by the microphone 232 and attitude information acquired by the motion sensor unit 280, and so on, to image data of a still image or moving image and record it in the storage unit 250, or output it through the external input/output unit 260 or the radio communication unit 210.

In the above-mentioned smart phone 201, for example, each above-mentioned processing unit related to point image restoration processing can be arbitrarily realized by the main control unit 200 and the storage unit 250, and so on.

The present invention can be provided as a computer/program/product that stores: a computer-readable program code to cause a device (for example, a digital camera, a camera phone and a smart phone) to perform the above-mentioned processing; a non-temporary computer-readable recording medium (for example, an optical disc (for example, a CD (Compact Disc), a DVD (Digital Versatile Disc), a BD (Blu-ray (registered trademark) Disc)) in which the program code is stored; a magnetic disc (for example, a hard disk and a magneto-optical disk) and a USB (Universal Serial Bus) memory); and a code that can execute the method.

It is needless to say that the present invention is not limited to the above-mentioned embodiments and various changes can be made without departing from the spirit of the present invention.

Here, the present invention is not limited to the examples described in this specification and the examples illustrated in the drawings, and it is natural that various design changes and improvements can be performed without departing from the scope of the present invention.

What is claimed is:

1. A restoration filter generation device that generates a restoration filter to perform restoration processing on luminance system image data that is image data related to luminance, which is generated based on image data of respective colors of multiple colors obtained by an imaging device having an optical system, comprising:
    a processing circuitry configured to:
    acquire transfer function information corresponding to point image distribution in the optical system, for each color of the multiple colors; and
    generate the restoration filter based on the acquired transfer function information and generate the restoration filter that performs phase correction of the luminance system image data according to the transfer function information on a single color of the multiple colors.

2. The restoration filter generation device according to claim 1, wherein the processing circuitry is further configured to select a single-color phase shift amount whose absolute value is minimum, from phase shift amounts of respective colors of the multiple colors obtained from the transfer function information on respective colors of the multiple colors, and generate the restoration filter to correct a phase shift of the luminance system image data by a phase correction amount corresponding to the selected single-color phase shift amount.

3. The restoration filter generation device according to claim 2, wherein the processing circuitry is further configured to select the single-color phase shift amount for each position in an image surface and generate the restoration filter that corrects a phase shift of the luminance system image data according to the single-color phase shift amount.

4. The restoration filter generation device according to claim 3, wherein, when a sign of the phase shift amount is different in the multiple colors, the processing circuitry is further configured to set a phase correction amount with respect to the luminance system image data to 0, and, when the sign of the phase shift amount is identical in all of the multiple colors, select a single-color phase shift amount whose absolute value is minimum, adopt a phase correction amount corresponding to the single-color phase shift amount and generate the restoration filter.

5. The restoration filter generation device according to claim 2, wherein the processing circuitry is further configured to select the single-color phase shift amount for each spatial frequency and generate the restoration filter that corrects a phase shift of the luminance system image data according to the single-color phase shift amount.

6. The restoration filter generation device according to claim 1, the processing circuitry includes an operation unit that operates a filter coefficient of the restoration filter, assuming the number of taps of the restoration filter as an input parameter and assuming an absolute value of a phase correction amount of the restoration filter to be equal to or less than an absolute value of a phase shift amount in the optical system every spatial frequency.

7. The restoration filter generation device according to claim 1, wherein:
    one color of the multiple colors is green (G);
    the processing circuitry is further configured to acquire at least transfer function information on green (G) of multiple colors; and
    the processing circuitry is further configured to generate the restoration filter that corrects a phase shift of the luminance system image data by a phase correction amount corresponding to the transfer function information on green (G).

8. The restoration filter generation device according to claim 1, further comprising a switching device switching whether to cause the restoration filter to perform the phase correction with respect to the luminance system image data, wherein, when the restoration filter is not caused to perform the phase correction, the processing circuitry is further configured to mix the transfer function information between multiple colors, and, based on the transfer function information mixed between the multiple colors, generate the restoration filter that performs restoration processing on the luminance system image data without changing a phase component.

9. The restoration filter generation device according to claim 8, wherein:
    the processing circuitry is further configured to acquire optical transfer functions of respective colors of multiple colors in the optical system by performing Fourier transform of point image distribution functions of respective colors of the multiple colors in the optical system; and
    when the restoration filter is not caused to perform phase correction, the processing circuitry is further configured to mix modulation transfer functions of respective colors that are amplitude components of the optical transfer functions of respective colors between the multiple colors, and, based on the modulation transfer functions mixed between the multiple colors, perform restoration processing on the luminance system image data without changing a phase component.

10. The restoration filter generation device according to claim 1, wherein:
the processing circuitry is further configured to acquire lateral chromatic aberration correction information that shows whether to implement lateral chromatic aberration correction with respect to image data of respective colors of the multiple colors before the luminance system image data is generated; and
when detecting that the lateral chromatic aberration correction is implemented based on the lateral chromatic aberration correction information, the processing circuitry is further configured to perform coordinate movement processing for a correction amount in the lateral chromatic aberration correction on the acquired transfer function information on respective colors, and mix the transfer function information on respective colors after the coordinate movement processing between multiple colors.

11. The restoration filter generation device according to claim 1, wherein the optical system includes a lens unit that modulates a phase and extends a depth of field.

12. An image processing device comprising:
an image data acquisition device acquiring luminance system image data that is image data related to luminance, which is generated based on image data of respective colors of multiple colors obtained by an imaging device having an optical system;
a restoration filter generation device according to claim 1;
a restoration filter storage device storing the restoration filter generated by the restoration filter generation device; and
a restoration processing device performing restoration processing on the luminance system image data acquired in the image data acquisition device, using the restoration filter stored in the restoration filter storage device.

13. An image processing device comprising:
an image data acquisition device acquiring luminance system image data that is image data related to luminance, which is generated based on image data of respective colors of multiple colors obtained by an imaging device having an optical system;
a restoration filter storage device storing the restoration filter generated by a restoration filter generation device according to claim 1; and
a restoration processing device performing restoration processing on the luminance system image data acquired in the image data acquisition device, using the restoration filter stored in the restoration filter storage device.

14. An imaging device comprising:
an imaging device with an optical system for outputting image data of respective colors of multiple colors; and
an image processing device according to claim 13.

15. A restoration filter generation device that generates a restoration filter to perform restoration processing on luminance system image data that is image data related to luminance, which is generated based on image data of respective colors of multiple colors obtained by an imaging device having an optical system, comprising:
a processing circuitry configured to:
acquire transfer function information corresponding to point image distribution in the optical system, for each color of the multiple colors; and
generate the restoration filter based on the acquired transfer function information,
the processing circuitry is further configured to mix the transfer function information between multiple colors, and, based on the transfer function information mixed between the multiple colors, generate a restoration filter to perform restoration processing on the luminance system image data without changing a phase component.

16. A restoration filter generation method that generates a restoration filter to perform restoration processing on luminance system image data that is image data related to luminance, which is generated based on image data of respective colors of multiple colors obtained by an imaging device having an optical system, comprising:
an information acquisition step of acquiring transfer function information corresponding to point image distribution in the optical system, for each color of the multiple colors; and
a restoration filter generation step of generating the restoration filter based on the transfer function information acquired in the information acquisition step and generating the restoration filter that performs phase correction of the luminance system image data according to the transfer function information on a single color of the multiple colors.

17. An image processing method comprising:
an image data acquisition step of acquiring luminance system image data that is image data related to luminance, which is generated based on image data of respective colors of multiple colors obtained by an imaging device having an optical system; and
a restoration processing step of performing restoration processing on the luminance system image data acquired in the image data acquisition step, using the restoration filter generated in a restoration filter generation method according to claim 16.

18. A non-transitory computer-readable medium recording a program for generating a restoration filter to generate a restoration filter to perform restoration processing on luminance system image data that is image data related to luminance, which is generated based on image data of respective colors of multiple colors obtained by an imaging device having an optical system, and causing a computer to execute:
an information acquisition step of acquiring transfer function information corresponding to point image distribution in the optical system, for each color of the multiple colors; and
a restoration filter generation step of generating the restoration filter based on the transfer function information acquired in the information acquisition step and generating the restoration filter that performs phase correction of the luminance system image data according to the transfer function information on a single color of the multiple colors.

* * * * *